July 20, 1954
F. M. DESSART ET AL
2,684,104
MACHINE FOR AND METHOD OF PRINTING SHEET
MATERIAL AND FORMING ARTICLES THEREFROM
HAVING SHAPED SURFACES
Filed Dec. 16, 1950
10 Sheets-Sheet 1
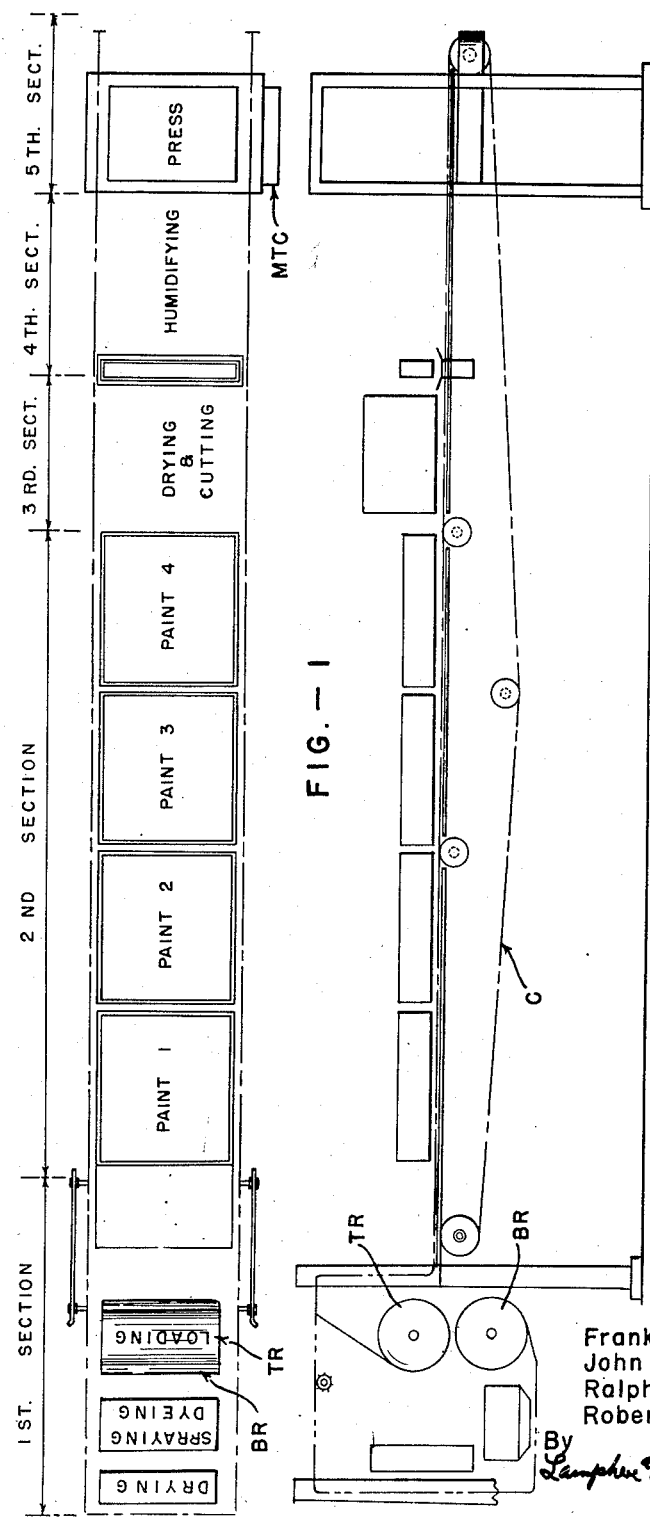
INVENTORS
Franklyn M. Dessart,
John G. Cuming,
Ralph W. Becker and
Robert B. Watkins
By Lamphere and Van Valkenburgh
ATTORNEYS

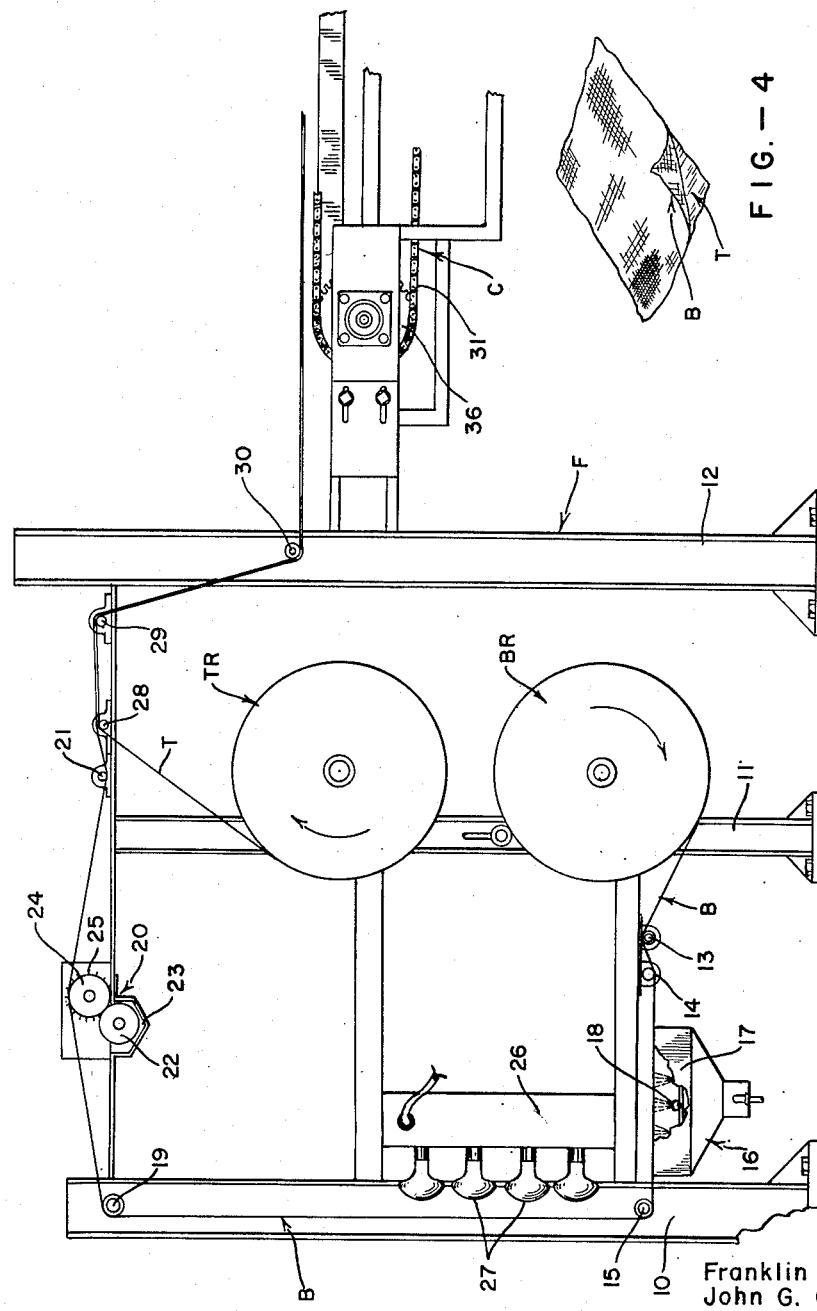

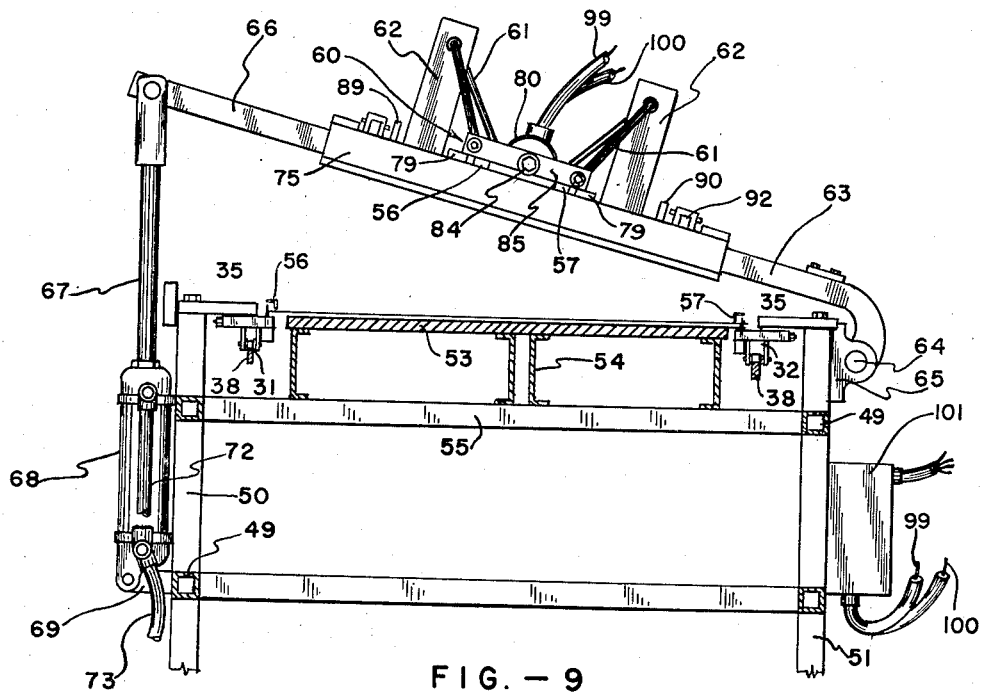
FIG. — 9
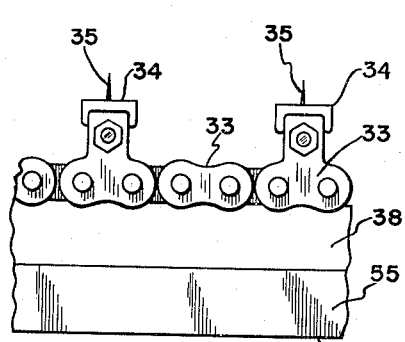
FIG. — 5
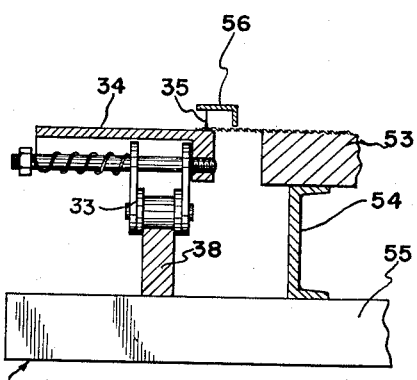
FIG. — 7
INVENTORS
Franklin M. Dessart
John G. Cuming,
Ralph W. Becker and
Robert B. Watkins
By
*Lamphere and Van Valkenburgh*
ATTORNEYS

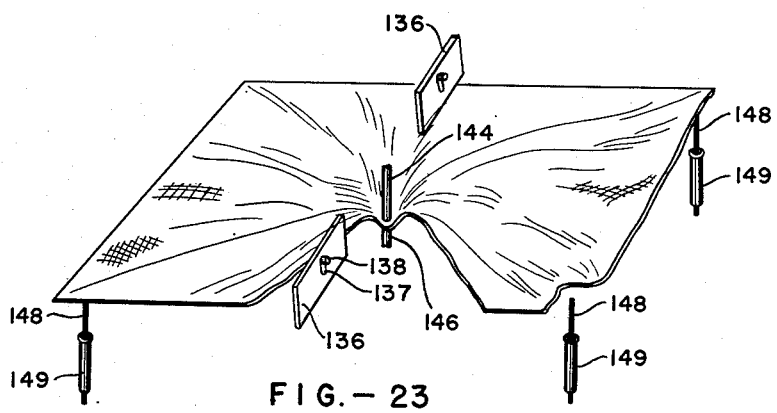
FIG.—23
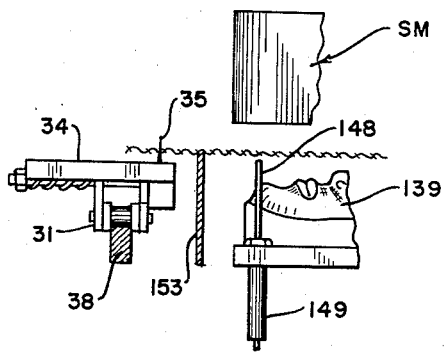
FIG.—20
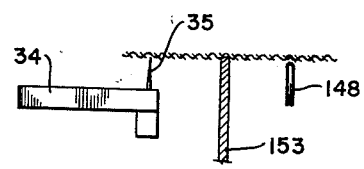
FIG.—22
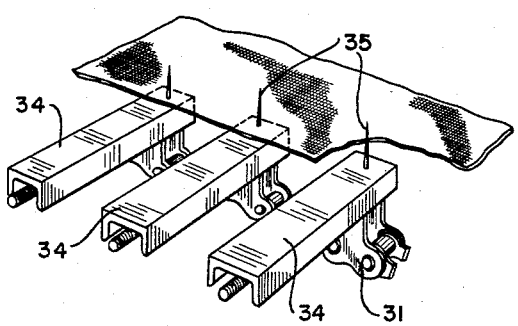
FIG.—6

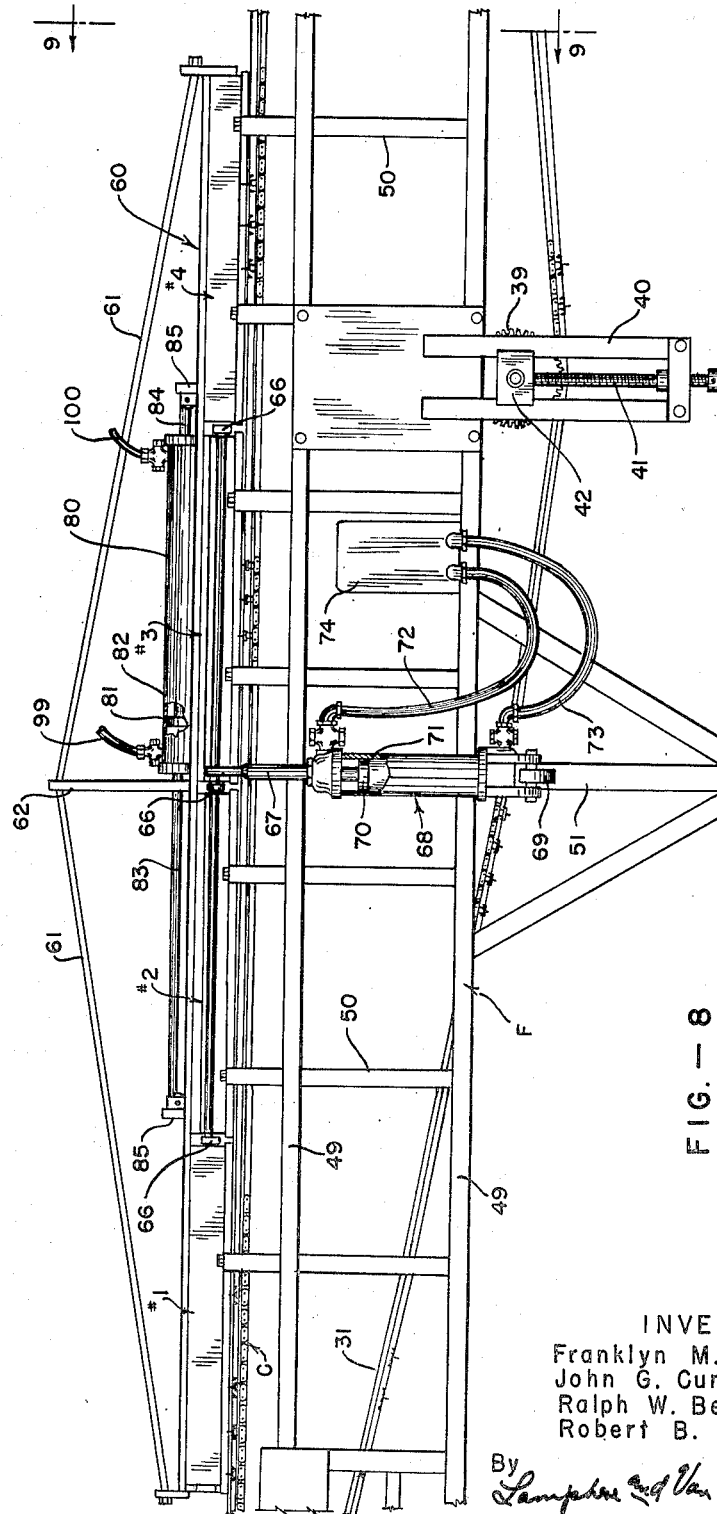

July 20, 1954
F. M. DESSART ET AL
2,684,104
MACHINE FOR AND METHOD OF PRINTING SHEET
MATERIAL AND FORMING ARTICLES THEREFROM
HAVING SHAPED SURFACES
Filed Dec. 16, 1950
10 Sheets-Sheet 6
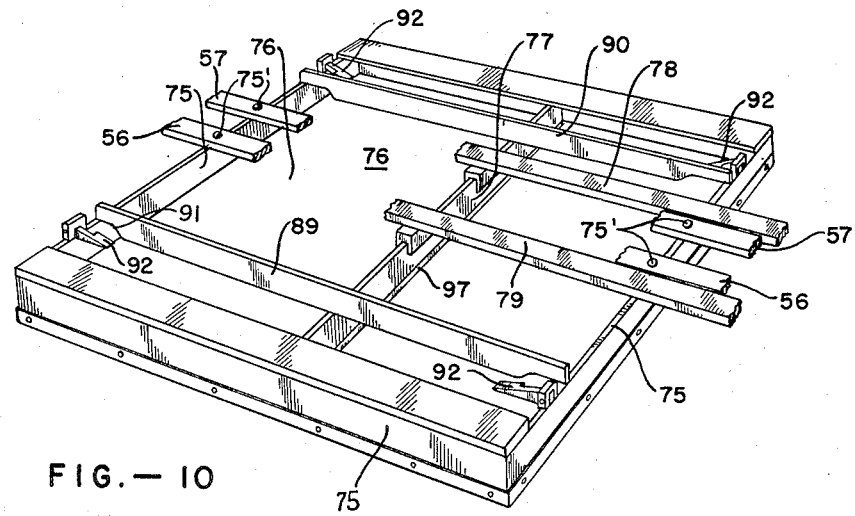
FIG.—10
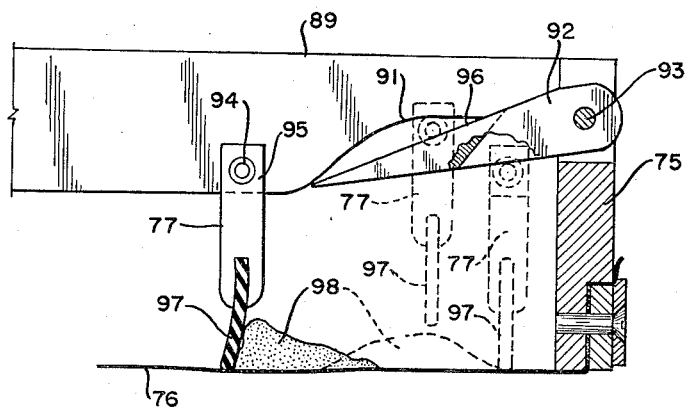
FIG.—12
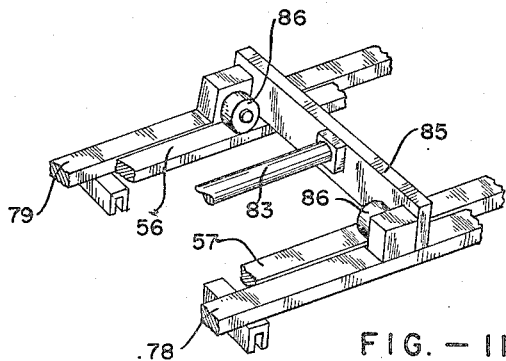
FIG.—11
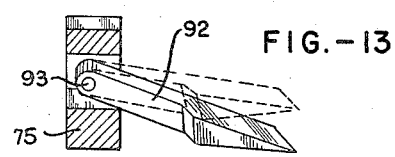
FIG.—13
INVENTORS
Franklyn M. Dessart,
John G. Cuming,
Ralph W. Becker and
Robert B. Watkins
By Lampher and Van Valkenburg
ATTORNEYS

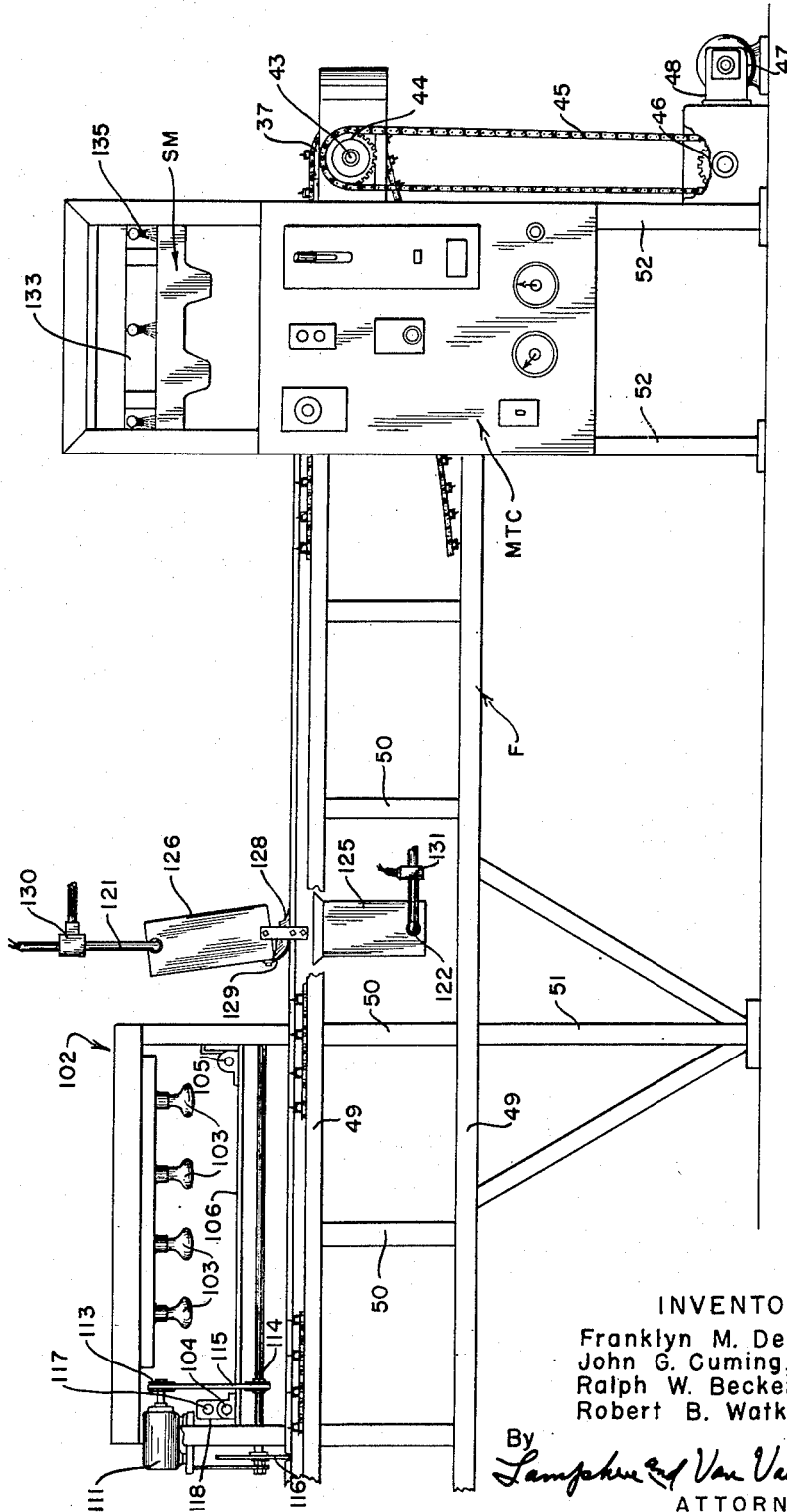

July 20, 1954
F. M. DESSART ET AL
2,684,104
MACHINE FOR AND METHOD OF PRINTING SHEET
MATERIAL AND FORMING ARTICLES THEREFROM
HAVING SHAPED SURFACES
Filed Dec. 16, 1950
10 Sheets-Sheet 8
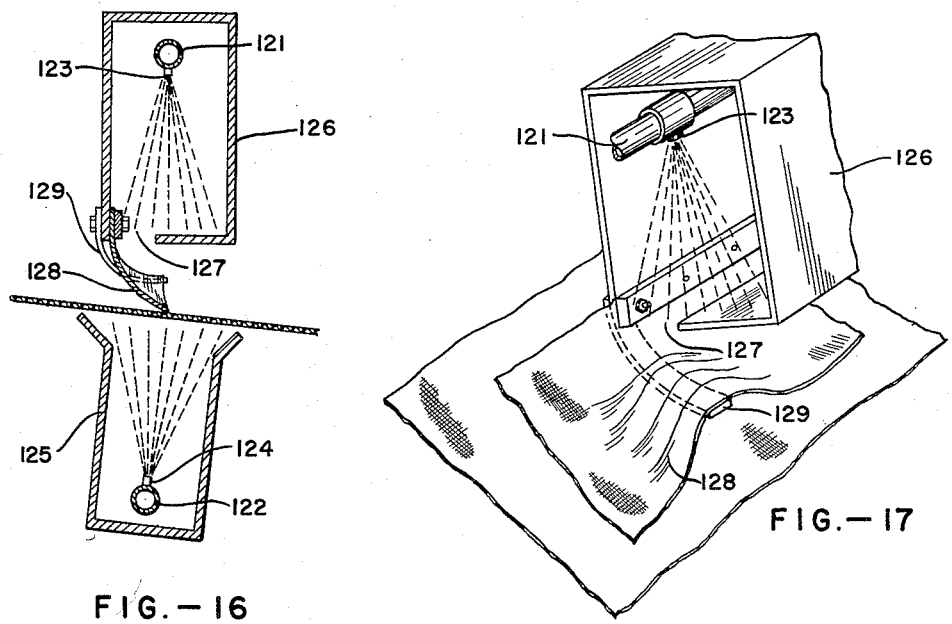
FIG.—16
FIG.—17
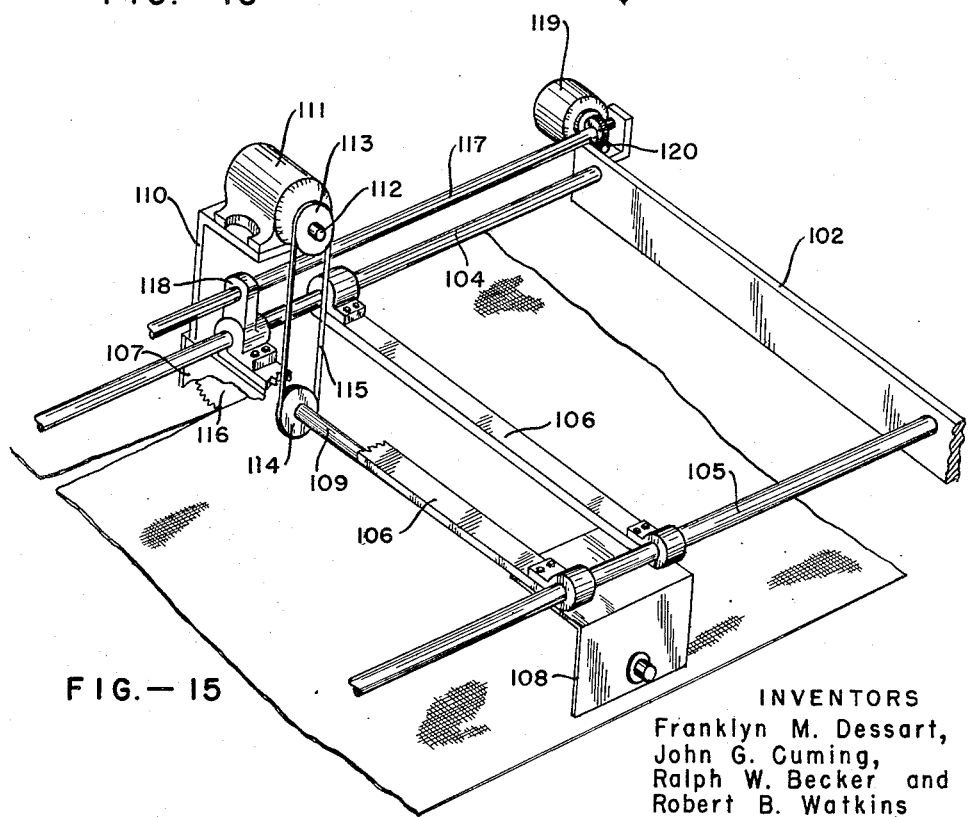
FIG.—15
INVENTORS
Franklyn M. Dessart,
John G. Cuming,
Ralph W. Becker and
Robert B. Watkins
By Lamphere and Van Valkenburgh
ATTORNEYS July 20, 1954 F. M. DESSART ET AL 2,684,104
MACHINE FOR AND METHOD OF PRINTING SHEET
MATERIAL AND FORMING ARTICLES THEREFROM
HAVING SHAPED SURFACES
Filed Dec. 16, 1950 10 Sheets-Sheet 9
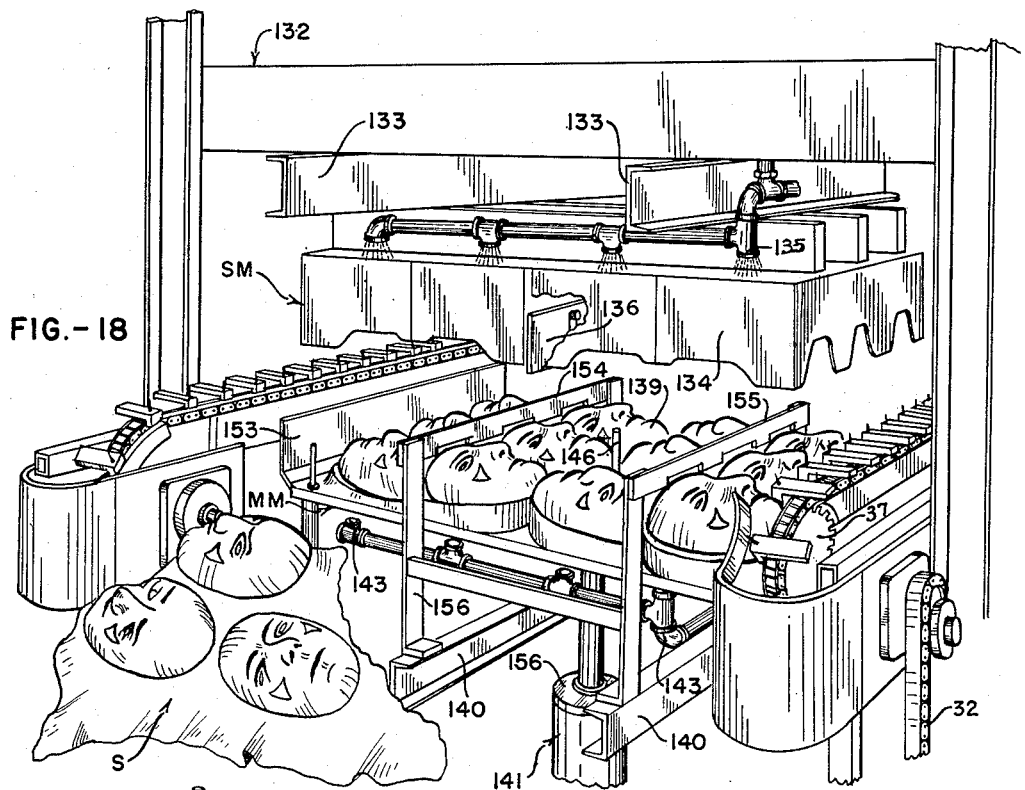
FIG.-18
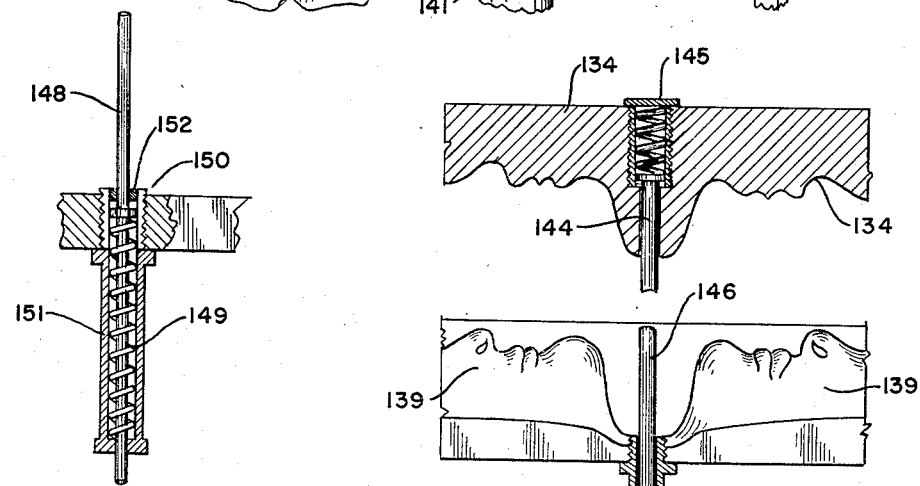
FIG.-21
FIG.-19
INVENTORS
Franklyn M. Dessart,
John G. Cuming,
Ralph W. Becker and
Robert B. Watkins
By
Lamphere and Van Valkenburgh
ATTORNEYS

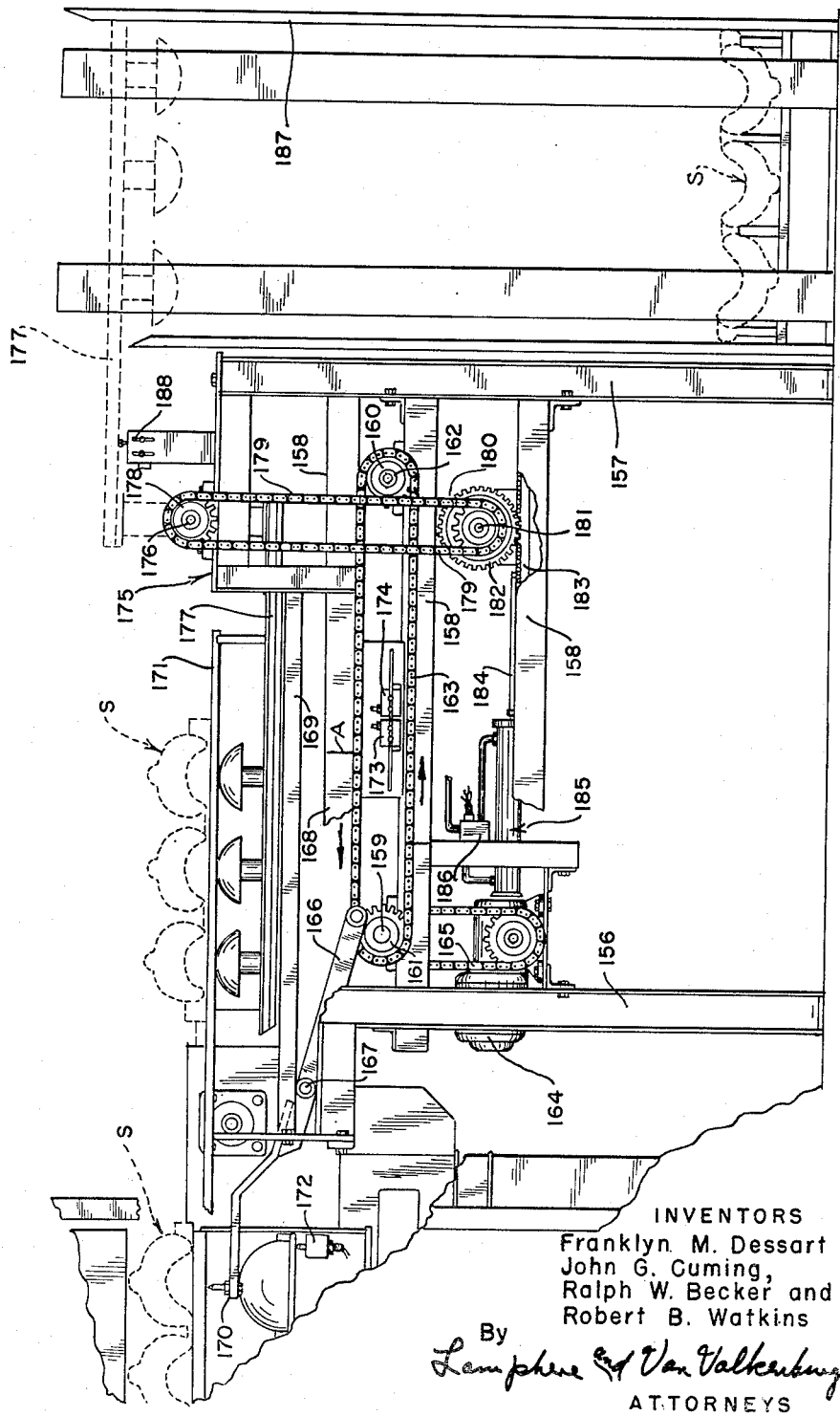

Patented July 20, 1954

2,684,104

UNITED STATES PATENT OFFICE 2,684,104

MACHINE FOR AND METHOD OF PRINTING SHEET MATERIAL AND FORMING ARTICLES THEREFROM HAVING SHAPED SURFACES

Franklyn M. Dessart, Forest Hills, N. Y., John G. Cuming, Old Greenwich, Conn., and Ralph W. Becker and Robert B. Watkins, Denver, Colo., assignors to Dessart Bros. Inc., Brooklyn, N. Y., a corporation of New York Application December 16, 1950, Serial No. 201,218

33 Claims. (Cl. 154—1)

This invention relates to a new machine for and a new method of printing sheet material with a plurality of colors and accomplishing such in a continuous and automatic manner, and further to the forming of the colored material into articles having shaped masks if such articles are desired to be produced from the colored material. The invention has been embodied in a mask making machine, but it is to be understood that such is by way of example only because a machine embodying the invention and capable of performing the steps of the new method can be employed to make colored sheet material and shape it as desired for other purposes than for masks.

One of the objects of our invention is to produce a machine whereby a continuous sheet of flexible material can be moved therethrough and automatically processed so as to be provided with a plurality of different colors placed thereon by a silk screen technique.

Another object is to produce an improved method and a machine for automatically carrying out the method whereby a single continuous sheet of flexible material can be first colored, then have adhered to one of its surfaces another continuous sheet of flexible material, and thereafter the first sheet have applied thereto a plurality of different colors, all being accomplished during moving of the sheet through the machine.

Still another object is to produce a machine which will apply to each of succeeding sections of a continuous sheet of material a plurality of different colors by a silk screen technique, each color being applied to a section of the sheet as it is caused to move from one station to another and said machine being so automatically controlled and operated that the coloring will be accomplished as the continuous sheet is caused to move from station to station through the machine.

A further object is to produce an improved method of applying different colors to a sheet of material and then subsequently forming the material so as to have a predetermined contoured surface.

Still a further object is to produce a new method and a machine for automatically carrying out the steps of the method whereby a glue-sized material can have applied thereto a plurality of different colors and then subsequently the material can be permanently shaped in a desired manner by the application of moisture and the operation thereon of heated forming dies, all being accomplished as the glue-sized material is caused to move through the machine.

Yet a further object is to produce a new machine for so operating on a sheet of flexible material, embodying a substance permitting the sheet to take a different permanent shape when subjected to heat and pressure moulding operation, that said sheet can be caused to take such shape that its surface will be provided with a plurality of contoured portions spaced apart and extending above the sheet surface, all without a wrinkling of the sheet material.

A further object is to produce a machine for coloring with different colors separate sections of a sheet of material capable of being formed in permanent contoured shapes by heat and pressure and then so simultaneously forming the section of the sheet by heated companion dies as to produce permanent contour shapes which will have the colors in the desired location on each shape.

A further and more specific object is to produce an automatically operated machine for making face masks or like articles from a continuous sheet of glue-sized material such as buckram, said material entering the machine at one point and after being operated upon at successive stations a plurality of masks will be simultaneously completed on a section of the sheet material as it comes from the machine, each mask in completed form simulating a face in shape and having applied thereto the necessary different colors to give complexion to the face of the mask, together with any desired characteristics or markings.

A further object is to produce an improved automatically operating machine for making face masks or the like which will eliminate all hand painting.

A further and more specific object is to produce an automatically operating machine for painting sheet material different colors by a silk screen process so as to place thereon simulated faces.

A still further object is to produce by machine operations a face mask or like article from buckram material which will have on its inside surface a covering sheet of soft material and on its outside surface the desired plurality of colors to give the face complexion and other desired features.

Another object is to produce an improved machine for forming in a simultaneous manner from a single sheet of buckram material a plurality of contoured surfaces to simulate a plurality of faces thereon, all without wrinkling of the material where the faces are formed.

Yet a further object is to provide a die apparatus for forming a plurality of simulated face shapes or other contour shapes from a flat sheet of buckram or like material which has had painted on its flat surface a plurality of colors to thus simulate complexions and other facial features.

A still further object is to produce improved means for removing sheets of material from a machine which acts upon said sheets in periodic sequence as sheets are successively fed thereto.

Other objects of our invention will become apparent from the following description taken in connection with the accompanying drawings showing the mask making machine in which the invention has been embodied.

In the drawings:

Figures 1 and 2 are schematic plan and side views of the machine illustrating the various steps performed as the material passes through the machine as far as the press section;

Figure 3 is a side view of the first or loading and dyeing section of the machine in which the continuous buckram sheet is fed into the machine, given a base dyeing and then has applied to one side a sheet of soft tissue material;

Figure 4 is a perspective of a piece of the combined buckram and tissue material as it comes from the first section of the machine;

Figure 5 is a side view of a portion of one of the two endless conveyor chain structures by means of which the continuous sheet of material coming from the first section of the machine is carried through the remaining sections of the machine;

Figure 6 is a perspective view of a portion of the chain showing the material held by the pins;

Figure 7 is an enlarged cross sectional view through one of the chains and associated structure showing how the sheet material will be maintained held on the pins;

Figure 8 is a side view of the second or painting section of the machine where four different colors of paint are applied by a silk screen technique;

Figure 9 is a sectional view of the painting section as viewed on the line 9—9 of Figure 8;

Figure 10 is a perspective view showing details of one of the painting divisions with the squeegee moving over the silk screen;

Figure 11 is another perspective view showing details of the structure involved in performing the painting;

Figure 12 is a sectional view taken at one end of a painting division showing structure for causing the squeegee to move over the paint as it reaches the end of its travel and thereby assume proper position to move the paint back over the silk screen to perform painting on its return stroke;

Figure 13 is a perspective view of the pivoted guide which causes the squeegee to be raised over the body paint;

Figure 14 is a side view of the third, fourth and fifth sections of the machine, where drying and cutting are performed, then humidifying, and lastly the moulding by a press to shape the masks;

Figure 15 is a perspective view showing the saw structure to cut off sections of the continuous sheet material and also make each section a predetermined length;

Figure 16 is a cross sectional view through the apparatus for spraying water and applying moisture to both sides of the sheet material prior to the forming operation in the press;

Figure 17 is a perspective view partly in section showing additional details of the upper spray means;

Figure 18 is a perspective view of the press section with the dies in open position;

Figure 19 is a sectional view through the center of the dies showing the two spring biased cooperating plungers for grasping the section of the sheet material as the dies are caused to assume moulding relation;

Figure 20 is a detail view, partly in section, of one corner of the dies and the associated structure including the chain, a stripper plate and a spring loader corner plunger for holding the corner of the sheet material against the upper die as the lower die moves toward closed position;

Figure 21 is a longitudinal sectional view showing details of one of the spring loader corner plungers;

Figure 22 is a detail view showing how the stripper plates lift the sheet material from the pins of the chain as the dies begin to assume closed relation;

Figure 23 is a perspective view of a sheet section with some of the structure which operates thereon during the operation of the press, said view illustrating how the sheet section is acted on so that wrinkles will be prevented when the dies perform the moulding and also illustrating how gravity plates will function to assist in gathering the sheet material into the dies during closing of the moulds so there will be uniform moulding without tearing of the material; and Figure 24 is a side view of the last section of the machine which is employed to remove the section of the sheet material from the press after the masks have been formed.

Referring to the drawings, and first to Figures 1 and 2, there is shown a general schematic outline of the various parts of the machines and steps involved in carrying out the method of constructing face masks in an automatic manner by operation of the machine. As indicated in these two figures, the materials from which the masks are to be made are loaded and fed into the machine at the right hand end thereof and these materials comprise two pieces of sheet material adhered together, then moved through the machine on a conveyor and after being acted upon at various stations throughout the machine a plurality of masks, shown as twelve in number, will be finished on each section of the material when this section comes from the right hand end of the machine and leaves the last station which acts upon it and comprises a press wherein the moulding operation forming the face contours of each mask is situated. The machine, as shown in the schematic views of Figures 1 and 2, can be divided up into five sections. The first or initial section of the machine, starting at the left hand end, is that section in which the buckram material, indicated at B, or any other suitable glue-sized material that is desired to be operated upon, is loaded into the machine from a roll which is indicated by the letters BR. During the loading of the machine and while it is passing through this first section, the sheet of buckram material, as it continuously comes from the BR roll, is first caused to be dyed a suitable color which, in this particular instance in making face masks may be pink, but could be any other color. Following the dyeing operation the buckram material will be caused to pass through a suitable dryer which will dry the dye. After this dye is dried, there will be adhered to one side of the sheet of buckram material a sheet of soft tissue paper indicated at T which comes from a roll marked TR. The purpose of applying this thin sheet of tissue material to the buckram is to give the inside of the finished mask a soft feeling to the face. The tissue material will be adhered to the normal bottom surface of the buckram and by "normal bottom surface" will be that surface which is on the underneath side of the buckram material as it passes on through the machine. The adhering of the tissue material to the bottom surface of the buckram material will be accomplished by a suitable adhesive and this will be applied to the buckram material after drying of the dye has occurred, through the use of any suitable means, which will be illustrated as an adhesive applying roller. Following the placing of the glue upon the bottom surface of the buckram, the tissue material and the buckram will pass over a single roll with the tissue material underneath the buckram material and by this method the two sets of material will be adhered together and form the combined sheet material from which the masks are going to be made. Of course, if it should be desired to make the masks without the thin tissue on the inside thereof, the step of applying the soft tissue paper to the buckram can be eliminated.

After the material comes from the first section of the machine where loading has occurred and preparation of the material for mask making has been performed, the combined sheet material will then be attached to a suitable conveyor indicated at C and from here on the material will then be carried through the machine. The conveyor is constructed from two endless chains and thus, by moving these chains, the material can be continuously picked up and attached thereto for carrying on through the machine for the continuous operation of the machine. After the material becomes attached to the conveyor it moves into what has been indicated as the second section of the machine and it is in this second section that different colored paints are placed on the combined tissue and buckram sheet material. As indicated in Figure 1, there are four paint stations in the second section of the machine. Each of these paint stations involves a silk screen technique for applying paint to the top surface of the buckram material. Each paint station will be simultaneously operated with each other paint station and consequently four different colors of paint can be applied to the buckram material. During the application of the paint to the top of the buckram material the conveyor will be stopped. If we assume that buckram material extends under all four of the paint stations being carried to such position by the conveyor, then as paint is applied to the top surface of the buckram material while the conveyor is stopped, that section of the buckram material which is under the paint station marked 1 will be having applied to it the color of paint desired, which we can say, for example, is red. While the red paint is being applied at station 1, some other color of paint, for example black, is being applied at station 2 on the section of the buckram material which is just ahead of the section on which the red paint is being applied. This section which is receiving the black paint having already had applied thereto the red paint when such section was at the paint station 1. During the application of paint at stations 1 and 2, application of other paint is being done at paint stations 3 and 4 on sections of the buckram material which have already passed through previous stations and had other colors applied thereto. Thus, for example, station 3 can be applying a brown paint and station 4 a green paint. The control of the conveyor will be such that it will move a section of the buckram from one station to the other only between stops of the motor. Thus, each section as it is caused to be moved from paint station 1 through paint stations 2, 3 and 4 will, when it reaches paint station 4, have received paint which is applied at all four stations. By use of proper silk screens at these paint stations, having predetermined cut out portions for applying paint, the result will be that after a section has passed through all the paint stations it will have imprinted upon the top surface of the buckram material a plurality of faces, such faces being on a pink or other colored background, due to the fact that the buckram was first dyed this color when it was moved through the first section of the machine comprising the loading and dyeing section. In the actual mask making machine which has been constructed, there will be painted on each section of buckram material (and by a "section" is meant that part of the continuous buckram material which is substantially the same length as the buckram is wide) twelve faces in four rows of three faces to a row. The faces will be so arranged that there will be two pairs of rows with each pair having the top or forehead part of the face in juxtaposition.

The third section of the machine, as indicated in schematic view of Figure 1, involves the cutting and drying and it is in this section that the paint is caused to dry in a suitable dryer and, while drying, the section of buckram material which has had the twelve faces printed thereon and has just moved from the last paint station will be cut off from the continuous sheet of buckram material. This cutoff section, however, will continue to be carried by the conveyor. As this cutoff section continues to move forwardly through the machine it will pass through the fourth section of the machine where it is caused to be humidified or moistened by water and this moistening will be caused to occur on both sides of the buckram and tissue material from which the mask is to be made. The purpose of the humidifying section is to prepare the material for the press where the moulding operation takes place to form the material into twelve contoured shapes simulating the contours of faces. In the moulding operation male and female face contour dies are used and these dies are caused to so act on the material that the face contours formed in the buckram material will be so related to the colored faces painted on the material that the colored faces will have proper position on the contoured shapes and a simulated face will result. When the masks are formed in the press, the section of buckram material will be removed from the conveyor and this removal, followed by the moulding operation, will all be accomplished during a stopped condition of the conveyor, which stopped condition will also be taken advantage of to cause painting to occur at all the paint stations of the second section, drying and cutting to occur in the third section and a fairly uniform saturation of moisture in the fourth section which has just passed through the moisture applying station. After the twelve masks have been formed by the press in the cut off section of buckram, these twelve masks will be automatically removed by separate apparatus and caused to be deposited in a bin, this structure and its operation also to be described in detail later. The masks can now be cut out from the section and also openings for the mouth and the eyes. Following this the desired elastic holding band can be attached and the mask is ready for shipping.

The entire operation of the machine is intended to be fully automatic and there will be provided a master timer control which is indicated in Figures 1 and 14 by the letters MTC. Details of the timer control will not be described in this application, it being understood, however, that the entire timing will be accomplishd in an electrical manner and by the use of known electrical devices, or by any other means such as mechanical devices. By proper timed switching a motor will be caused to start and stop to so move the conveyor that any given section of the buckram material will move from one station to another station. The period of stopping of the conveyor will be of sufficient length of time that the painting can be accomplished at all of the paint stations, the cutting and drying can occur and the press operate to mould the faces and, after moulding of a cut off section, such can be removed from the press. As will become apparent from a detailed description of the parts of the machine, the silk screens at the various paint stations will move down upon the buckram material and squeegees, which apply the paint through the silk screen to the top surface of the buckram, will operate and after operation the silk screens will be raised from the buckram material. This will all be accomplished by the use of air pressure motors which will be controlled by solenoid operated valves under the control of the master timer control.

With the above general description of the automatically operable mask making machine, the details thereof will now be described and reference is first had to Figure 3 wherein the first section of the machine, that is, the loading and dyeing section, is disclosed. This section has pairs of upright posts 10, 11 and 12 (one only of each pair being shown) forming the rear part of the frame F of the machine. The uprights are suitably connected together by cross supports as shown. On the lower portion of the posts 11 the roll of buckram material BR is mounted for free rotation. From this roll the buckram material B, which is a continuous sheet of material, passes over a roller 13 and then under a roller 14 and from there it moves in a horizontal direction to a roller 15 suitably journaled in the rear pair of posts 10. In passing in a horizontal direction from the roller 14 to the roller 15 the buckram will move across a dyeing apparatus 16 having a pan 17 in which are positioned sprays 18. With these sprays the dye will be sprayed onto the entire "bottom" surface of the buckram material, considering its position at this point, said "bottom" later being the top surface. The color of this dye for the masks will preferably be pink or other simulating a flesh color, although other colors could be used, such as white for a clown face. It will be noted that the arrangement for the dyeing is such that the dye being sprayed will be on the "bottom" surface of the buckram and thus, if any excess dye should be applied to the buckram, it can drip back into pan. If the spraying were done from the top, it would be possible for the excess dye to collect in pools on the buckram material and there would not be a uniform dyeing.

From the roller 15 the sheet of buckram will move upwardly and over a roller 19 at the top of the posts 10 and from there it will pass over the adhesive apparatus, generally indicated at 20, and thereafter beneath a roller 21. The adhesive is applied by the use of a roller 22, partially positioned in an adhesive containing pan 23, and the roller will engage with another adhesive applying roller 24 which will be in contact with the bottom surface of the buckram as it moves over this roller 24. In order to insure that the roller 24 will be rotated and the adhesive uniformly applied to the bottom of the buckram, the ends of the roller 24 will have small radially extending pins 25 which can project through the open mesh structure of the buckram at its edges and thus as the buckram is pulled over the roller it will insure that the roller 24 will rotate. The pins 25 will not interfere with the smooth contact of the roller 24 in the pan because these pins will be spaced beyond the ends of the roller 22.

To insure that the dye on the buckram will be fully dried before any adhesive is applied, a dryer 26 is situated at a point to operate upon the buckram after it comes from the dyeing unit. As shown, the dryer acts upon the buckram between the two rollers 15 and 19 and while the buckram is moved vertically upward before turning at the top of the machine to pass to the adhesive apparatus. The dryer, as indicated, consists of a plurality of infra red lamps 27 so mounted as to provide a bank. If desired, other types of drying apparatus could be used. In connection with the adhesive operation it is also believed to be apparent that other adhesive applying structure could be substituted for the roller arrangement. For example, the adhesive could be wiped on by a brush as the continuous sheet of buckram material moves forwardly.

As already indicated in the general outline of the machine, the buckram will have adhered to its bottom surface a sheet of soft tissue material T, thus giving to the resulting masks a soft inner surface for engagement with the face of the wearer. This tissue material T comes continuously from a roll TR which is mounted on the pair of posts 11 above the buckram roll BR. The sheet of tissue material T passes up and over a roller 28 which is above the roll of tissue material TR and also slightly forwardly of the previously mentioned roller 21. The buckram material which has passed beneath the roller 21 also passes over the top of the roller and it is arranged to be on top of the continuous sheet of tissue material which is passing over the roller 28. Since the buckram material has had applied to its bottom surface an adhesive material, then as the sheets of buckram and tissue material come together when they pass over the roller 28, they will be adhered together. With these two sheets of material now adhered to each other, the sheet material from which the masks are to be made is formed and such sheet of material then passes over rollers 29 and 30 to the second section of the machine where it is caused to have its edges attached to the endless chains of the conveyor C. The combined buckram material and tissue material forming the sheet of material from which the masks are to be made is illustrated in Figure 4, it being noted that the buckram is on top of the soft tissue paper and the two held together as one continuous sheet by the adhesive material.

The next or second section of the machine is that section in which the different colors of paint are applied to the top surface of the buckram material. The details of this section are variously disclosed in Figures 8, 9, 10, 11, 12 and 13. Before describing the painting operation, however, a description of the conveyor is believed to be in order since this conveyor picks up the combined buckram and tissue paper material at the beginning of the painting section and carries the said material all the way through the machine until the masks are finally formed in the press or last section. The conveyor comprises two endless chains 31 and 32 of identical construction, mounting and length. One chain is on one side of the machine and the other chain is on the other side of the machine and between the two they constitute the conveyor C.

As best shown in Figures 5, 6 and 7, each chain has a plurality of links 33 pivotally connected together, somewhat on the same order as a bicycle chain. As can be seen in Figures 5 and 7, alternate links 33 will have mounted thereon blocks 34 and the upper surface of these blocks will thus provide a support on which the buckram and tissue paper material can be supported at its edges. On the inner end of each of these blocks is a pin 35 and it is by means of this pin that the buckram material will be attached to each chain so that the material can be carried on through the machine.

Each endless chain is trained over a sprocket 36 at the beginning of the paint section of the machine and from this rear sprocket each chain will extend forwardly through the succeeding sections and then be trained over a sprocket 37 at the forward end of the machine just outside of the press or moulding section, as can be seen in Figures 14 and 18. As the upper part of each chain moves through the machine it will be supported so that sagging will not occur, such supporting structure being shown in Figures 7 and 9 and constituting a plate 38 carried on the frame structure F of the machine. In order that each chain will be maintained taut the lower side of the chain will pass over an idler sprocket 39 shown in Figure 8, this sprocket being mounted in a suitable support 40 and capable of adjustment by means of a screw 41 which will act to shift the bearing 42 of the idler sprocket. The two forward end sprockets 37 of the chains will be mounted on short shafts 43 and these shafts will constitute the drives for the conveyor. As can best be seen in Figure 14, the shafts 43 carry sprockets 44 and the sprockets will be driven by means of endless chains 45 from sprockets 46 mounted at the base of the machine. The sprockets 46 will be driven by a motor 47 through speed reduction gearing 48.

The entire frame structure over which the conveyor will move and which forms a part of the second to fifth sections of the machine will be made up of various horizontal girders 49 and vertical girders 50. These horizontal and vertical girders will be supported from the floor by suitable posts 51, as variously indicated in Figures 8 and 14. The front end of the machine will have its section supported by other posts 52 which will constitute legs for the press section which will have the frame structure attached thereto.

Referring again to the paint section which is illustrated in Figures 8 to 13 as already noted, the frame of the machine over this section will have a flat bed 53. As can best be seen in Figure 9, this bed is supported on angle irons 54 carried by cross braces 55 of the frame structure. The bed 53 will lie between the two chains 31 and 32 of the conveyor C and when the chains of the conveyor have picked up the combined buckram and tissue paper material at the sprockets 31 (see Figure 3), the combined sheet material will be pulled over this flat bed 53 by the pins of the chains which have now pierced the buckram material at its edge. While the combined sheet material is being pulled over the bed and the painting operations are being performed, it is desirable that such material be prevented from being pulled off the pins and to accomplish this plates 56 and 57 will be carried by the frame structure and arranged to just overlie the tops of the pins 35 of the chains as these chains move along the frame structure, all as best shown in Figures 5 and 9. The plates 56 also have flanges which will act to maintain the material down on the pins. This is further illustrated in Figure 7.

The four paint divisions of the painting section will all be attached to longitudinally extending members constituting a single frame structure 60. Since this frame structure 60 will be of considerable length and it is necessary to raise it from and lower it onto the buckram material as such material passes over the bed, the frame structure has truss bars 61 which are connected to the ends of the members 56 and 57 and at their centers pass over posts 62, all of which is disclosed in Figures 8 and 9. In order to move the frame structure 60 down to an overlying position on the bed 53 and to conveniently raise it off the bed so the combined buckram and tissue material will be free to be moved forward by the conveyor, one side of the frame structure will be provided with two spaced arms 63 pivoted to the rear side of the machine by pins 64 suitably carried in journal blocks 65, all as disclosed in Figure 9 (one arm only being shown). On the forward side of the frame structure there are extension arms 66, the outer ends of which will be connected together and to a piston rod 67 which forms part of a fluid motor 68. This motor is arranged vertically at the front side of the machine and has one end pivoted by a bracket 69 to the main machine frame structure at one of its posts 51. The fluid motor 68 is a double acting motor, and by this is meant that air under pressure can be applied to either side of the piston 70 to cause it to be positively reciprocated. Air is introduced into the upper end of the cylinder 71 through a hose connection 72 and into the lower end of the cylinder through a hose connection 73. These hoses are connected to control valves which are arranged to be operated by solenoids. All the valves and solenoids are enclosed within the casing 74 mounted on the forward side of the frame, as shown in Figure 8.

When air is introduced into the lower end of the cylinder and allowed to exhaust from the upper end, the piston 70 will be moved upwardly and consequently the frame structure 60 will be raised off the bed 53 into the position shown in Figure 9. When air is introduced into the upper end of the cylinder and allowed to exhaust from the lower end of the cylinder, the frame structure 60 will be lowered onto the bed and into a position above the buckram material which is overlying the bed.

As already mentioned, the frame structure 60 carries the four paint divisions, all similar, and in Figure 10 the one paint division is disclosed by way of example. The division is a relatively square box compartment established by side walls 75. Each box is attached to the underside of the longitudinal members 56 and 57 of the frame structure 60 by suitable bolts 75', thus permitting the entire box to be easily removed from the frame structure 60 for cleaning, etc. Across the bottom of the paint compartment is stretched a silk screen 76 and this silk screen has cut out portions through which paint can be forced by a squeegee and applied to the top surface of the buckram material in the desired pattern. If, for example, it is desired to apply a red paint to the twelve faces which are going to be painted on the top surface of a section of the buckram material so as to simulate lips of the faces, then the silk screen will be so conditioned that the red paint will pass through the silk material and be applied to the buckram in the shape of lips.

The squeegee, which is shown at 77 in Figure 10, extends crosswise of the paint compartment above the silk screen and this squeegee is carried on two flat rods 78 and 79. These rods extend longitudinally across all of the four paint box compartments which are attached to the frame structure 60 and the squeegee for each paint division will be secured to these flat rods. The squeegees are all so spaced apart on the rods that whenever the rods are moved longitudinally towards the rear of the machine, for example, the squeegee will be caused to be moved completely across each paint box in a simultaneous manner and when the rods 78 and 79 are moved longitudinally in the opposite direction all the squeegees will be moved back across the paint boxes in a simultaneous manner, each reaching the end of its paint box at the same time.

The rods 78 and 79 are operated by a double acting fluid motor 80 which is mounted on the central part of the frame structure 60, as can best be seen in Figures 8 and 9. This fluid motor has its piston 81, which is slidable in the cylinder 82, connected with two piston rods 83 and 84, the piston rod 83 extending from one end of the cylinder and the piston rod 84 extending from the other end of the cylinder, as best seen in Figure 8. These piston rods are connected to the flat rods 78 and 79, which extend longitudinally over the frame structure 60, by means of a cross bar 85 shown in Figure 11. Figure 11 shows only the piston rod 83 connected to the cross bar 85, but it will be understood that the piston rod 84 will also be connected by a similar cross bar to the rods 78 and 79 at the other end of the fluid motor. In order that rods 78 and 79 can be properly supported and easily reciprocated, the ends of the cross bar will carry rollers 86 and these rollers will rest upon the longitudinally extending members 56 and 57 of the frame structure 60, it being noted that rods 78 and 79 are adjacent said members in parallel relation.

In performing the painting operation at each painting station it is desirable to have the paint applied through the silk screen each time that a squeegee is caused to move across the compartment of a paint division. In other words, paint should be applied when the squeegee is moved toward the rear of the machine and paint should be applied whenever the squeegee moves in the opposite direction toward the front of the machine. To accomplish this, it is necessary to always have the paint, which is to be applied, positioned ahead of the squeegee as it moves toward either end of the paint compartment and in accordance with one feature of the machine a unique control for each squeegee is provided. The control insures that each squeegee, as it approaches the end of its travel, will be caused to be raised above the screen and moved over the ridge of paint which has been pushed ahead of it as it crossed the silk screen. Figures 10, 11 and 12 illustrate the control apparatus and reference is now made thereto. As can be best seen in Figure 10, each paint compartment adjacent its side will be provided with rails 89 and 90 under which the squeegee 77 will be moved. These rails will insure that as the squeegee moves from one end to the other it will be held down with proper pressure on the top of the screen and the paint will be forced through the cut out portions of the silk screen in the desired manner. At the end of each of these rails the lower edge will be cut away, as indicated at 91, thus permitting the squeegee to move upwardly away from the silk screen. Adjacent each cut away edge of a rail and mounted on the end walls 75 of the compartment, there is provided a lifting or guide member 92 pivoted to the end wall by a pin 93. Each guide member extends forwardly to a point where the cut away edge 91 begins and is so mounted that the pointed end will be positioned just below a roller 94 which is carried by a projection 95 on the squeegee, there being two such rollers, one at each end of the squeegee. The roller is so related to the pivoted guide member 92 that it can roll up the top inclined surface 96 thereof and thereby raise the rubber wiper 97 of the squeegee upwardly so it can pass over the ridge of paint, indicated at 98, which it has been shoving before it as it moved across the silk screen. When the squeegee moves up the inclined surface 96 sufficiently so as to pass over the ridge of paint, the squeegee is allowed to fall back onto the screen behind the ridge of paint. This is accomplished by cutting a notch in the guide member closely adjacent its pivot.

The notch allows the roller 94 to drop down past the guide member and again permit the rubber blade of the squeegee to assume its position on the silk screen, but at a point behind the ridge of paint 98. The squeegee will then be ready for its reverse movement whereby it can push the same paint before it and apply the paint through the silk screen in the same manner as it did on its finished stroke. When the squeegee moves across the screen again, after being raised and lowered by the pivoted guide members, the roller will be free to move under the guide member and raise it against the action of gravity.

The double acting fluid motor is to be operated by air pressure and to accomplish this the ends of the cylinder are connected by conduits 99 and 100 with control valves which are enclosed within a casing 101 on the back side of the machine, as can be seen in Figure 9. The control valves are arranged to be solenoid operated. Both the solenoid control valves in the casing 101 and the previously referred to casing 74 (controlling the fluid motor 68 for raising and lowering the frame structure 60) will be arranged to be co-ordinated in a manner that first the fluid motor 68 will be operated to lower the frame structure down onto the sheet of buckram which is being moved through the machine by the conveyor. When the frame structure 60 is lowered, the sheet of buckram material, of course, will be stationary due to stopping of the conveyor driving motor 47 which is stopped and started by the master timer control MTC as a part of a cycle of operation for the machine. As soon as the frame structure 60 is lowered onto the top of the buckram in a stopped position, the fluid motor 80 will be caused to operate and this will result in the squeegees for the four printing sections being moved in one direction, thereby printing four sections of the buckram with different colors and designs. After the squeegees have made their movement in one direction, the control valves for the fluid motor 68 will be so automatically controlled that the frame structure 60 will be raised off from the buckram to the position shown in Figure 9. This will then permit the conveyor C to again move by operation of motor 47 a predetermined distance under the control of the master timer and complete the remaining cycle of the machine. The movement of the conveyor C will only be sufficient to move the buckram from one station to another, at which time the conveyor will again stop so that painting can again be accomplished and also other operations, as will become apparent from the following description of the other sections of the machine.

Referring to Figures 14 and 15, the details of the section of the machine performing the drying and cutting operations will be described. In Figure 14 this section is shown at the left hand side of the view. The general frame structure F of the machine has a superstructure 102 built thereon. Mounted in the upper part of this superstructure is a bank of infra red lamps 103 which will perform a rapid drying of paint which has been applied to the top surface of the buckram after said buckram has been caused by the conveyor and the controlling means therefor to move through the paint section and have applied thereto at proper places different colors of paint with different places of application to thereby simulate the desired face which is going to be put on the finished mask.

While this drying is being accomplished, the section of the combined buckram and tissue paper, upon which twelve faces have been painted, will be cut from the continuous sheet of material which has come through the painting section. As shown in Figures 14 and 15, the superstructure 102 has mounted thereon two cross rods 104 and 105. Slidable on these rods is a carriage structure 106 having downwardly extending supports 107 and 108 at its ends. In these supports is journaled a shaft 109, which shaft will be at right angles to the rods 104 and 105 upon which the carriage slides. Above the shaft 109, carried by a suitable support 110 on the carriage, is an electric motor 111. The driving shaft 112 of this motor is parallel to the shaft 109 on the carriage. The motor 111, by means of pulleys 113 and 114, mounted on the motor shaft and the shaft 109 respectively, together with a belt 115, is capable of rotating shaft 109. The end of the shaft 109 below the motor has a saw 116 secured thereto for accomplishing the cutting off of the section of buckram as the carriage is moved.

Above the cross rod 104 upon which the carriage 106 is slidable there is mounted a parallel screw shaft 117 which has its opposite ends journaled in suitable mountings carried by the superstructure 102. Cooperating with this screw shaft is a nut 118 fixed to the carriage 106. The screw shaft is arranged to be rotated by a motor 119 connected to one end thereof by a worm 120 carried on the end of the motor shaft. The motors 111 and 119 will be properly controlled through the master timer control MTC and necessary switches. The operation of the motor 119 will cause the carriage to be moved across the conveyor and this movement of the carriage will permit the saw to cut off a section of the buckram from the continuous sheet coming through the machine. During the movement of the carriage across the conveyor, the motor 111 will be operating so the saw is driven at a high speed. Motor 119 is a reversible motor in order that the carriage may be moved across the conveyor in one direction to perform a sawing operation and then back across the conveyor to also perform a sawing operation. This movement back across the conveyor does not take place until the following cycle of operation of the machine whereby the conveyor is moved, and a new uncut section of the fully painted buckram is moved into the drying and sawing section of the machine.

The sawing operation will be accomplished during the stopped condition of the conveyor and occurs simultaneously with the paint being applied to sections of the buckram which are beneath the compartments of the painting section. The saw 116 preferably has its teeth so designed that it will cut the buckram material by rotating in one direction only, regardless of which direction it is moving across the conveyor. The worm which moves the carriage for the saw will be of such length with respect to the width of the conveyor that it will move beyond the conveyor and be out of the way when the sawing has been completed so that during the cycle in which the conveyor moves the buckram forward there will not be any interference. It will be noted that the pins 35 on the conveyor, which project through the buckram material and hold the buckram material to the conveyor chain, are mounted on blocks which are above the links of the chain and these blocks are spaced apart. Thus there will be room for the saw to pass between these blocks after completing the cutting of the buckram material. Where the saw moves over the conveyor chain there will be provided a suitable gap in the plates 56 and 57 so there will be no obstruction to the movement of the saw.

After the sawing has been accomplished, together with the drying of the painted faces, the conveyor carries the cut off section of the buckram material, upon which the twelve faces have been painted, into the moistening section which is shown in Figure 14 and additional details thereof in Figures 16 and 17. The moistening is accomplished during the movement of the cut off section by the conveyor after it leaves the sawing and drying section. As will be seen in Figures 14, 16 and 17, there is provided above the conveyor a crosswise extending pipe 121 and beneath the conveyor a crosswise extending pipe 122. The pipe 121 has a plurality of spray nozzles 123 therein which are directed downwardly so that a spray of water will be directed downwardly onto the top of the buckram material. The pipe 122 beneath the sheet of buckram material will also have spray nozzles 124 which will be directed upwardly so water conducted through the pipe 122 can be sprayed onto the bottom tissue material of the sheet which passes above the pipe 122. The pipe 122 is within a trough-like structure 125 extending across beneath the conveyor. This trough-like structure has for its purpose the collecting of any excess water that may come off from the tissue material and thus confining it and providing a drain-off means.

The pipe 121 above the conveyor is enclosed within a box-like structure 126. This box-like structure has a slot 127 in its bottom wall which will permit the downwardly sprayed water coming from the nozzles 123 to pass outwardly and thereby moisten the buckram material. Below this slot 127 there is provided a sheet of cloth material, such as canvas 128, supported by a finger 129. The finger and cloth are all attached to one wall of the box-like structure, as best shown in Figures 16 and 17. The finger holds the central part of the canvas slightly above the buckram and thus the front central edge of the buckram can move under the canvas without being caught and buckled. As the water is sprayed downwardly and passes out of the slot 127, it will fall onto the sheet of canvas 128 and thoroughly wet this canvas. As the buckram material is moved by the conveyor and caused to pass above the nozzles 124 and beneath the box-like structure 126, it will be dragged beneath the canvas and this canvas will then cause a moistening of the buckram material. At the same time the water sprayed upwardly from the nozzles 124 will wet the tissue material attached to the bottom.

The purpose of moistening the buckram and tissue material is to condition it for operation thereon by the press section to shape the material so as to simulate the contours of a face. The moulds which shape the faces are to be heated and the moisture in the buckram and tissue material will prevent these heated moulds from scorching the buckram and tissue material, and also subject the buckram and tissue material to a hot steam condition which has such temperature that the sizing material in the buckram will establish a bond between the tissue material and the buckram as the tissue material is pushed into the meshes of the buckram. Furthermore, this steam will insure that the sizing will cause the buckram to take a set, conforming to the shape in which it is pressed by the male and female dies of the mould.

Water will be conducted to the pipes 121 and 122 to cause the spraying to take place only during that cycle of the machine wherein the conveyor is caused to be operated to move the material through the machine. As shown in Figure 14, pipe 121 will be provided with a valve 130 which can be controlled by a solenoid. In a similar manner pipe 122 will be connected with a valve 131 which will also be solenoid controlled. The conductors for the two solenoid controlled valves will be connected into the main timer control MTC. The control will be such that when the motor 47 is caused by the timer control to move the conveyor forwardly, there will be suitable switches closed to also open the valves 130 and 131 and cause water to be sprayed on the upper and lower surfaces of the combined buckram and tissue material. When the conveyor stops, the timer control will open the switches controlling the solenoids of the valves 130 and 131, thus cutting off water to the spraying nozzles.

As the conveyor is moved forwardly during a cycle of operation, the moistened section of combined buckram and tissue material will be moved into the press section at the rear end of the conveyor, said moistened section still being connected to the conveyor section by means of the pins 35. Before entering the press section, the moistened section of buckram will have one movement during a cycle of operation of the machine in which no work will be done thereon. It is in the press section that the combined buckram and tissue material will be shaped to simulate faces and these face shapes will be so formed in the section of buckram material which has been cut off by the saw that the paint on each face will be properly located on a face shape. Thus, when the section comes from the press there will be twelve masks (the number selected, but which can be varied as desired), all fully painted and ready to be cut out to provide finished masks and have applied thereto the rubber band for holding the mask on the face when it is being worn.

As best shown in Figure 18, the press has a frame structure 132 built up from various angle irons and to which the forward end of the conveyor will be mounted. In this frame structure above the conveyor there is mounted a stationary mould SM, fixed on cross angle irons 133. This stationary mould is made up of a plurality of female dies 134. Each of these dies is constructed so the cavity thereof conforms in shape to a face contour which is desired to be moulded into the mask. These dies are cast of a suitable metal and there will be twelve in number, arranged three in a row with four rows. The dies are arranged to be heated, for example, by gas burners 135 positioned above the dies, the burners being connected by suitable pipe to a source of gas. Other heating means such as electricity can be employed, if desired. In arranging the dies 134 they will be so positioned in the mould that two rows of dies on one side of a longitudinal axis of the mould will have their forehead ends in juxtaposition and the other two rows of dies on the opposite side of the mould will have their forehead ends in juxtaposition. The dies can have small holes to allow escape of steam and thereby permit quicker drying.

Mounted in the upper mould will be two gravity plates 136. These plates extend longitudinally through the mould, and by longitudinally is meant the direction of movement of the conveyor. The plates 136 are at the central longitudinal axis of the mould and thus lie between the six dies on one side of the mould and six dies on the other side of the mould. Each plate is provided with a slot 137 through which extends a pin 138 carried by the moulds. Ordinarily each plate, because of the action of gravity, hangs on the pin 138 and when so hanging the bottom edge of the plate will extend a short distance below the bottom plane of the mould. The plates, however, can be moved upwardly relative to the mould by a sufficient lifting force to overcome the hanging weight of the plate. The purpose of these gravity plates is to aid in gathering in the buckram material prior to moulding and also to assist in disengaging the buckram material from the female dies after the moulding operation has been accomplished and the male dies, which are going to cooperate with the female dies, have been withdrawn from the female dies. The particular functioning of the plates will be later referred to so their operation will be clear.

Beneath the stationary mould SM there will be provided a movable mould MM. This movable mould carries twelve male dies 139 which have an exterior contour conforming to that of a face. The dies 139 are complementary to the female dies 134 which are in the stationary mould SM. Thus, when the movable mould MM is moved upwardly the male dies will move into the female dies and cause a shaping of the buckram material to establish the twelve face shapes in the buckram material. The movable mould MM is suitably mounted for movement on fixed angle irons 140 and moving will be accomplished by a fluid motor 141 with its piston rod 142 connected to the mould to cause an upward movement thereof when the motor is operated. The dies of the movable mould will be heated in a manner similar to the dies of the stationary mould, it being seen from Figure 18 that there are provided beneath the dies gas burners 143 which are connected by suitable piping to a source of gas. The dies 139 are arranged in rows of three, there being four rows. The male and female dies are arranged to properly cooperate with each other and the faces painted on the buckram material will be so placed that the shaped faces will have painted features in their proper places.

When the section sawed off from the continuous strip of buckram material moving through the machine is caused to move into position in the press by movement of the conveyor and then subsequent stopping thereof, the section in the press will be initially engaged at the center when the lower mould begins to move upwardly. This is accomplished by structure shown in Figure 19. It will be noted from this figure that the center of the upper mould carries a slidable pin 144 which is backed by a relatively strong spring 145. Directly below this pin 144 and mounted in the movable mould MM is another slidable pin 146 which is backed by a spring 147 weaker than the spring 145. These pins 144 and 146, which are axially aligned, will have their ends in spaced position when the moulds are open and the section of the buckram is being moved into the press. As the movable mould MM is caused to move upwardly the center of the buckram section will be clamped between the ends of the two pins and then as the movable mould continues to move upwardly the pin 146 will be pushed downwardly, due to the fact that the spring 145 backing up pin 144 is stronger than spring 147 backing up the pin 146. With this grasping of the section of buckram at the middle and the movement of the pin 146 downwardly, the result will be that the central part of the sheet will be moved downwardly into the center of the dies in the movable mould. This will cause the whole buckram section to be gathered inwardly towards the center, thus putting slack in the central part of the section of buckram so that a uniform moulding of the faces can take place without any tearing of the buckram.

To insure a uniform drawing in of the buckram, the four corners of the section of buckram in the press are slidably held. To accomplish this there are provided spring biased pins at each corner in the lower movable mould. These pins are shown in Figures 18, 20, 21 and 24, and an enlarged sectional view of one pin is shown in Figure 21. Each corner pin is indicated by the numeral 148. This pin fits downwardly into a cylinder 149 carried at the corner of the movable mould just outwardly of the dies. The pin has a shoulder 150 thereon and between this shoulder and the bottom of the cylinder is a spring 151 normally urging the pin 148 upwardly to where the shoulder 150 will be engaged with the closure element 152 at the top of the cylinder 149. The upper ends of the pin 148 are caused to be brought into engagement with the four corners of the stationary mould SM, this engagement taking place as the movable mould moves upwardly and at approximately the same time that the two pins 144 and 146 are caused to grasp the center of the buckram section. When the pins 148 engage the corners of the stationary mould, the engagement will only be by a slight pressure, as determined by the spring 151. The pressure is not great enough to prevent the sliding of the corners of the buckram inwardly as the pin 144 forces the pin 146 downwardly and gathers in the central part of the buckram section. The pins thus act to make a uniform pull at each corner of a buckram section and insure that the sides of the buckram section will not become unduly wrinkled as the drawing in takes place.

Before any drawing in is to be accomplished, it is necessary to have the section of buckram disengaged from the conveyor and this is accomplished by stripper plates. There is a stripper plate 153 carried at each side of the movable mould closely adjacent the conveyor chain. These stripper plates extend upwardly and above the top of the male dies and also above the top of the pins 148 at the corners of the movable mould and the pin 146 at the center of the movable mould. With these stripper plates the section of the buckram which is attached to the pins 35 on the conveyor chains will be lifted off of these pins as the movable mould MM moves upwardly. The lifting off will take place slightly prior to the engagement of the pins 148 against the upper movable dies and just after the buckram material is grasped between pins 144 and 146. This is well illustrated in Figures 20 and 22. Figure 20 shows a stripper plate engaging the buckram edge to begin to lift it off the pins. Figure 22 shows the stripper plate, having just removed the buckram edge from the pins, after which the corner pins 148 will slidably clamp the corners to the top stationary mould. After the stripper plates have moved the edges of the buckram sheet upwardly off the pins 35 carried by the chains, they will continue to move upwardly alongside the stationary mould as the moulds are continued to be brought together.

Associated with the movable mould are also two extractor bars 154 and 155. These bars are arranged to extend longitudinally of the movable mould and are arranged to be stationary. It will be noted from Figure 18 that the ends of the extractor bars are mounted on posts 156 which extend upwardly and are carried by the stationary angle irons 140 positioned below the movable mould. The "forehead" ends of the male dies which are arranged to be in juxtaposition for each pair of rows are slightly spaced apart in order to permit the extractor bars 154 and 155 to move downwardly between these dies as the movable mould moves upwardly, can pass upwardly beyond the extractor bars and then pick up the section of buckram to be moulded and move it in to the female cavities of the stationary mould. The extractor bars, during the moulding operation, will have no engagement with the section of buckram. However, after the moulding operation has taken place and the movable mould is caused to move downwardly to its fully open position, the male dies will move downwardly past the extractor bars and thus the extractor bars will be caused to engage the bottom of the moulded masks in the section of buckram and insure that this section will be peeled or lifted off of the male dies and thus lie free on the tops of the extractor bars.

From the above description of the press, including the stationary and movable moulds, it is believed to be obvious how the masks are moulded. The two cooperating pins 144 and 146 are not only useful in gathering in the section of buckram at the center, but serve an additional purpose of centering the whole section of buckram and aiding in making an adjustment of the various dies so that proper moulding will take place with respect to the painted faces on the section of buckram. Each section of buckram which is being painted with faces will also have painted on its center a dot about the size of a dime. Thus, when the dies are being set up and the whole machine properly adjusted for continuous operation with certain facial male and female dies being employed, this painted on dot at the center of the section will be caused to move so it will be directly beneath the rod 144 when the conveyor is brought to a stop. The center of the buckram section will then be known and this center will be positioned exactly between the two rods 144 and 146. With centering and holding of the section of buckram it will then be possible to make any necessary adjustments of the various dies, both male and female, so that when the two moulds are brought together the faces caused to be formed in the buckram will match up with the painted on faces and all facial features will be in their right place.

In order that the operation of the press may be clearly understood, let it be assumed that a section of buckram, as sawed off and previously moistened, is moved into the press by the conveyor and the conveyor stopped. The lower movable mould MM is then caused to move upwardly by the operation of the fluid motor 141. During the initial movement of this lower mould the stripper plates 153 will pick up the two edges of the buckram section which are attached to the pins 35 of the conveyor chains and release these edges from the conveyor chains. Directly after the disconnection of the buckram section from the conveyor chains, the pins 148 at the four corners will engage the buckram material and press it against the corner of the stationary mould. The movement of the movable mould upwardly will have already caused the pins 144 and 146 to be brought into engagement just slightly before the buckram is disconnected from the chains, and since the pin 144 is backed by a stronger spring it will push the buckram down at the center and gather in the buckram toward the center uniformly from all four corners. Simultaneously with this drawing in, the gravity plates 136 will engage the buckram material on each side of the pins 144 and 146 and tend, by their weight, to push the buckram material uniformly into the spaces between the male dies along the longitudinal axis, that is, the longitudinal line which divides the movable mould at its center with six male dies on each side. When the heated mould now assumes full engagement, the buckram material will be properly gathered and there will be sufficient material at all points so that moulding of the twelve face shapes can take place, this moulding being accomplished by heat and pressure between the male and female dies.

When the two moulds are in their closed positions and the forming of the faces is taking place, steam will be generated from the moisture in the combined buckram and tissue material, all being caused by heat from the dies. This steam will act upon the sizing in the buckram material and soften it together with the adhesive material applied when the tissue sheet was adhered to the bottom surface of the buckram. The pressure will push the tissue material into the meshes of the buckram and since the sizing is now softened by the action of the heat and steam, a good bond will be obtained between the tissue material and the buckram. After the moulds have been brought together and held together for a very short period of time, the lower mould is withdrawn from the upper stationary mould and it will have carried down with it the section of buckram. The loosening of the buckram from the female dies will be aided by the gravity plates 136 as the movable mould moves away. When the movable mould passes below the extractor bars 154 and 155, the combined buckram and tissue paper section will be lifted off from the female dies and will lie on the top of the extractor bars. This finished section with the masks moulded therein is shown partially out of the press in Figure 18 and is indicated by the letter S.

After the section S of combined buckram and tissue material has had the masks moulded therein and it is resting on the extractor bars following the opening of the moulds, such section will be automatically removed from the press and stacked while the conveyor is stopped. The structure for accomplishing the removing and the stacking of the moulded sections S is shown in Figures 24 and comprises a machine section placed beyond the end of the press and hereafter referred to as the remover-stacker section. This remover-stacker section has a frame structure comprising upright posts 156 and 157, together with various horizontal frame members 158. Mounted on the horizontal members are parallel shafts 159 and 160 which extend completely across the frame structure. On the ends of shaft 159 are sprockets 161 and on the ends of shaft 160 are sprockets 162. Trained over the sprockets are endless chains 163, it being understood that there is an endless chain on each side of the frame structure. The forward shaft 159 is arranged to be driven by a motor 164 by means of a chain 165 and suitable sprockets. The motor, when operated, turns in such a direction as to cause the endless chains 163 to move in the direction of the indicating arrows. Each chain 163 will have connected thereto, by means of a pivot pin, a finger arm 166. Each finger arm will move with the endless chain to which it is connected. Each finger arm carries a roller 167 which is arranged to move between two guide rails 168 and 169. The outer or free end of the finger arm carries a finger 170.

With this arrangement of the endless chains 163, the pivotally connected finger arms and the guides for the finger arms, it will be seen that as a pivoted end of the finger arm is caused to move around with the endless chain the finger on the end of the finger arm will be moved into the press beneath the forward side of the finished moulded mask section S. When the pivoted end of the finger is caused to move downwardly over the forward sprocket 161 it will lift the finger 170 upwardly to pick up the finished mask section and then move rearwardly by the lower run of the endless chain. As it moves rearwardly it will pull the finished mask section S completely out of the press.

On the frame structure of the remover-stacker machine there will be mounted a plurality of stationary rails 171 in parallel spaced relation and extending longitudinally of the machine. These rails will act as a rest or platform upon which the finished mask section S can be slid by the fingers as they are caused to move rearwardly when the endless chain pulls the arms 166 along the lower run of the chains. When the mask section S is pulled fully onto the rails, as indicated in dotted lines, the pivoted ends of the finger arms will have reached the sprocket 162 and be caused to move upwardly as the chains to which the arms are connected start their forward runs. When this occurs the fingers 170 will be swung downwardly away from the finished mask section, thus leaving it resting on the rails. The swinging of the fingers away from the mask section will be caused by the finger arms pivoting about the axis of the rollers 167 which move back and forth between the guide rails 168 and 169.

The starting position for the movement of the finger arms will be approximately at the line marked A and this also will be the stopping position for said arms after completing the removal of the finished mask section S from the press and placing it upon the rails 171. The motor 164, which controls the movement of the chains 163 and the finger arms, should be started only after the press is opened, and to accomplish this there will be a switch 172 in the press section which is engaged and closed by the movable mould MM as it is moved downwardly to the fully open position of the moulds, all as shown in Figure 24. In order to stop the motor, there is provided a limit switch 173 which will be controlled by the finger arm 166 as it moves thereover. Just ahead of the switch 173 is another limit switch 174, also actuated by the finger arm. The purpose of the switch 174 will be later referred to. The stopping of the motor will cause the finger arm to stop at approximately the position indicated at the line A. At the same time that the limit switch 173 is operated, the motor circuit will be set up so the motor can again be caused to operate whenever the switch 172 is closed by the next operation of the moulds in the press.

On the frame structure for the remover-stacker is a support structure 175 which has journaled thereon a cross shaft 176. Fixed to this cross shaft are two throw arms 177 (one only being shown in the side view of Figure 24), which throw arms are so spaced apart and arranged as to be capable of being moved between and to a point below the rails 171 upon which the finished mask section S will be placed when pulled out of the press. The shaft 176 is arranged to be oscillated through 180 degrees and this is accomplished by providing one end of the shaft with a sprocket 178 for connection by an endless chain 179 to another sprocket 180 which is secured to a shaft 181 journaled below the shaft 176 and on one of the horizontal frame members 158. This shaft 181 has a gear 182, also secured thereto, and meshing with this gear is a reciprocable rack 183. The rack 183 is secured to a piston rod 184 of a fluid motor 185 of the air pressure type. This fluid motor is double acting and is arranged to be controlled by solenoid operated valve means 186. The piston rod 184 has such a stroke that when it is moved to the left, as indicated by the arrow, it can, through the rack and gear, cause such a rotation of the endless chain 179 that the shaft 176 and the throw arms 177 will be swung through an arc of 180 degrees in a clockwise direction from the position shown in full lines of Figure 24 to the position shown in dotted lines. The throw arms have upstanding members which move into the inside of the faces of the masks and thus keep the finished sheet from sliding off the throw arms.

Such a swinging movement of the throw arms will result in the throw arms picking up the finished mask section S resting on the bars 171 and moving it over and into a basket 187 where it will drop to the bottom thereof. Thus, as additional finished masks are dropped into the basket by successive movement of the throw arms, they will be stacked therein. The basket is removable so it will be easy to move the finished masks away from the machine as the basket becomes filled. The basket has vertical open slots in its sides so it will be easy to push the masks down at periodic intervals and to also quickly and easily remove the masks when it is desired.

The limit switch 174, already referred to as being operated by the finger arm prior to operation of the limit switch 173 and the stopping of the motor, is the switch which will control the beginning of the operation of the fluid motor 185 by controlling a solenoid operated valve means 186. As the fluid motor completes its operation to move the rack and cause the throw arms 177 to swing over and deposit a finished mask section S into the basket, a switch 188 will be operated to so control the valve means 186 that the piston of the fluid motor 185 will be reversed so that the throw arms will again swing back through the supporting rails 171 to a position below their top surfaces.

From the foregoing detailed description of a mask making machine embodying our invention, it is believed to be obvious how such operates and the steps comprising the improved method involved. The machine operates entirely automatically and each cycle of operation is under the master timer control. Each cycle includes a stopped condition of the conveyor and a movement of the conveyor through a predetermined distance. During the stopped condition of the conveyor the painting frame structure 60 will be lowered so as to place the paint compartments in overlying position on the buckram. Painting then is caused to take place and thereafter the painting frame structure is raised. Also, during the stopped condition of the conveyor, a section of the combined buckram and tissue material will be cut from the continuous sheet, said section having been previously painted. Drying is also accomplished during the stopped condition of the conveyor.

Further, during the stopped condition of the conveyor, the press operates to mould the face shapes and following such moulding, with the moulds in open position and the conveyor still stopped, the sheet of formed masks is automatically removed from the press and stacked.

When the conveyor is moving, the dye will be added to the buckram as it comes from the roll and following this the buckram and tissue material will be combined and caused to be adhered together before the painting and other steps take place.

Throughout the specification, and in some of the claims, the flexible material operated upon is referred to as "buckram" or a "glue-sized material." The term buckram is not to be considered as restrictive in any sense. If woven cloth is used to make the "buckram," it can be a so-called tobacco cloth, print cloth, gauze or crinoline, among others. A non-woven cloth can also be used in which fibers are embodied therein and run one way only. The glue-sizing used on the cloth may be any suitable adhesive material such as boiling starch, starch paste, or such materials supplemented by other substances. The word "glue" is not to be considered as restrictive in any sense. As to the "tissue material" employed as a soft lining, this material may be either a cloth or a cellulose substance. Any suitable material is intended to come within the term employed.

As has already been mentioned, the mask making machine shown and described as embodying our invention is by way of example only, and the invention can be embodied in machines and the steps carried out in the making of other articles. Thus, being aware of the possibilities of modification in the machine disclosed to make painted and shaped articles, the many uses of the automatic painting procedures, the varying and rearrangement of the steps of the methods, and other changes, all without departing from the fundamental principles of our invention, it is to be understood that the scope of the invention is not to be limited in any manner except in accordance with the appended claims.

What is claimed is:

1. In a machine of the class described, a conveyor means for moving a continuous sheet of sized flexible meshed material and stopping same at predetermined time intervals, means carried by the conveyor means for attaching the side marginal portions only of the continuous sheet thereto, means operable each time the conveyor is stopped with the material attached thereto for severing the sheet to establish a section, a press comprising companion moulds having complementary male and female dies movable toward and away from each other, said press being associated with the conveyor means so that the dies will be open and the severed section will be moved into the press between the moulds by the conveyor means, means for moving the moulds toward and away from each other while the conveyor is stopped to thereby act on the section of material therebetween and shape the same to conform with the die shapes, and means operable before the moulds act on the material to free the material from the conveyor and thereby allow free inward drawing movement of the material during shaping thereof.

2. In a machine of the class described, a conveyor means for moving a continuous sheet of sized flexible meshed material and stopping same at predetermined time intervals, means carried by the conveyor means for attaching the side marginal portions only of the continuous sheet thereto, means operable each time the conveyor is stopped with the material attached thereto for severing the sheet to establish a section, means for spraying the severed sheet with a liquid while moving with the conveyor means, a press comprising companion moulds having complementary male and female dies movable toward and away from each other, said press being associated with the conveyor means so that the dies will be open and the severed section will be moved into the press between the moulds by the conveyor means, means for moving the moulds toward and away from each other while the conveyor is stopped to thereby act on the section of material therebetween and shape the same to conform with the die shapes, and means operable before the moulds act on the material to free the material from the conveyor and thereby allow free inward drawing movement of the material during shaping thereof.

3. In a machine of the class described, a conveyor means for moving a continuous sheet of sized flexible meshed material and stopping same at predetermined time intervals, means carried by the conveyor means for attaching the side marginal portions only of the continuous sheet thereto, means operable each time the conveyor is stopped with the material attached thereto for severing the sheet to establish a section, a press comprising companion moulds having complementary male and female dies movable toward and away from each other, said press being associated with the conveyor means so that the dies will be open and the severed section will be moved into the press between the moulds by the conveyor means, means for moving the moulds toward and away from each other while the conveyor is stopped to thereby act on the section of material therebetween and shape the same to conform with the die shapes, and mechanical means operable independently of the conveyor means and controllable by the press while the moulds of the press are open for removing the shaped material from the press.

4. In a machine of a class described, a conveyor means, a press including companion moulds having male and female dies and through which the conveyor means moves, means for connecting a continuous sheet of flexible material to the conveyor means so as to be moved therewith, means for stopping the conveyor means at a plurality of different stations in its path of movement, means embodying a silk screen printing means for simultaneously printing different designs on the sheet at each station while the conveyor means is stopped, means for severing a section from the printed sheet while on the conveyor means, means for stopping the severed section in the press, means for releasing the section from the conveyor means, and means for operating the press to closed and opened positions of the mould so that the dies will act on the sheet section therein and form shaped contour surfaces in predetermined relation to the designs.

5. In a machine of the class described, a conveyor means, a press, a continuous sheet of flexible material, means for connecting a continuous sheet of flexible material at its side marginal portions only to the conveyor means to be moved therewith, means for severing a section from the sheet while on the conveyor means, means for moving the severed section into the press by the conveyor means, cooperating moulds movable in the press to closed and open positions for acting on the sheet section and forming shaped contour surfaces, mechanical means functioning separately from the conveyor means for picking up and removing the moulded sheet section from the press, and means controlled by the press for causing the removing means to function when the moulds are open.

6. In a machine of the class described, a conveyor means, a press, a continuous sheet of sized flexible material, means for connecting a continuous sheet of flexible material to the conveyor means to be moved therewith, means for painting designs on the sheet, means for severing a section from the sheet while on the conveyor means, means for moving the severed section into the press by the conveyor means, cooperating moulds movable in the press to closed and open positions for acting on the sheet section and forming shaped contour surfaces in predetermined relation to the painted designs, and mechanical means including means for removing the moulded sheet section from the press and other cooperating means placing it on a stack in inverted position, said last named means being controlled by the press to be operable when the moulds are open.

7. In a machine of the class described, a press having cooperating moulds with complementary dies for forming contoured surfaces on a sheet of material, means for placing a sheet of material in between the moulds, mechanical means operable automatically after the moulds have acted on the sheet for removing said sheet from between the moulds in a direction lateral to mould movement and then depositing it on a support, and other mechanical means having coordinated movement with the removing means for lifting the sheet from the support and placing it in reversed condition at a point removed from the support.

8. In a machine of the class described, a press having cooperating moulds with complementary dies for forming contoured surfaces on a sheet of material, means for placing a sheet of material in between the moulds, and mechanical means operable automatically after the moulds have acted on the sheet for withdrawing said sheet by a general horizontal movement from between the mould and depositing it on a support, said last named means comprising finger members, and means for moving the finger members to a position beneath the sheet and into a bottom recess thereof formed by a contour inwardly of the sheet edge, subsequently raising the fingers to engage only the bottom of the sheet, pick up the sheet, moving the fingers horizontally away from the moulds and then lowering the fingers away from the sheet.

9. In a machine of the class described, a press having cooperating moulds with complementary dies for forming contoured surfaces on a sheet of material, conveyor means moving through the press laterally of mould movement and having means for attaching the sheet thereto, means for placing a sheet of material in between the moulds by a moving and stopping of the conveyor means, and means operable by upward movement of a mould but prior to a closing of the moulds for detaching the sheet which is between the moulds from the conveyor means.

10. In a machine of the class described, a press having cooperating moulds with complementary dies for forming contoured surfaces on a sheet of material, means for opening and closing the moulds, conveyor means having means for attaching the sheet thereto, means for placing a sheet of material in between the moulds by a moving and stopping of the conveyor means, means operable prior to a closing of the moulds for detaching the sheet from the conveyor means, and means engageable with the central part of the sheet for pushing said part downwardly between dies to thereby gather the sheet material toward the central part of the moulds after detachment of the sheet from the conveyor means and prior to full closing of the moulds.

11. In a machine of the class described, a press having cooperating moulds with complementary dies for forming contoured surfaces on a sheet of material, means for opening and closing the moulds, conveyor means having means for attaching the sheet thereto, means for moving and stopping the conveyor means, means for placing a sheet of material in between the moulds by a moving and stopping of the conveyor means, means operable prior to a closing of the moulds for detaching the sheet from the conveyor means, means for gathering the sheet material toward the central part of the moulds after detachment of the sheet from the conveyor means and prior to full closing of the moulds, and means for slidably holding the marginal portion of the sheet at spaced points during the gathering.

12. In a press for shaping a flat sheet of material so as to cause the sheet to have a plurality of raised contoured portions, cooperating moulds having complementary male and female dies for making the raised contoured portions, conveyor means for moving the flat sheet in between the moulds, means for moving the moulds together to perform the shaping, and means for holding the central part of the flat sheet as the moulds are being moved together and for also moving the held central part of the sheet below the highest part of the male dies.

13. In a press for shaping a flat sheet of material so as to cause the sheet to have a plurality of raised contoured portions, cooperating moulds having complementary male and female dies for making the raised contoured portions, means for moving the flat sheet into the moulds, means for moving the moulds together to perform the shaping, and means moving the central part of the sheet below the highest part of the male dies as the moulds move toward cooperating position to thereby gather in sheet material toward the central part of the moulds.

14. In a press for shaping a flat sheet of material so as to cause the sheet to have a plurality of raised contoured portions, cooperating moulds having complementary male and female dies for making the raised contoured portions, conveyor means for moving the flat sheet in between the moulds, means for moving the moulds together to perform the shaping, means for holding the central part of the flat sheet as the moulds are being moved together and for also moving the held central part of the sheet below the highest part of the male dies, and means for gripping the marginal portion of the sheet at spaced points as the dies move toward each other to thereby hold the sheet tensioned but not preventing the aforesaid movement of the central part of the sheet.

15. In a machine of the class described, a press for forming contoured surfaces in a sheet of flexible material comprising cooperating moulds having complementary male and female dies, means for closing and opening the moulds, and means separate from the dies and carried by the mould having the female dies for pressing the sheet downwardly between male dies to thereby gather in flexible material at this point as the moulds have relative movement toward closed condition but prior to any moulding operation on the sheet.

16. In a machine of the class described, a press for forming contoured surfaces in a sheet of flexible material comprising cooperating moulds having complementary male and female dies, means for moving the moulds relatively toward each other to closed positions, and a member separate from the dies and carried by the mould having the female dies and movable relative thereto for acting on the sheet of material as the moulds are caused to assume closed positions for engaging the sheet and causing it to be flexed and forced into a space between male dies all prior to any moulding operation.

17. In a machine of the class described, a press for forming contoured surfaces in a sheet of flexible material comprising cooperating moulds having complementary male and female dies, means for moving the moulds relatively to each other to closed positions, and means for grasping the central part of the sheet to be acted upon as the moulds are moved relatively to each other toward closed position and subsequently move the central part only of the sheet in between male dies prior to the moulds assuming full closed position.

18. In a machine of the class described, a press for forming contoured surfaces in a sheet of flexible material comprising cooperating moulds having complementary male and female dies, means for moving the moulds relatively to each other to closed positions, and means for grasping the central part of the sheet to be acted upon as the moulds are moved relatively to each other toward closed position and subsequently move the sheet in between male dies prior to the moulds assuming full closed position, said means comprising axially aligned reciprocable pins carried by the moulds for engaging opposite sides of the sheet of material and springs of different strength resisting movement of the pins.

19. In a machine of the class described, a conveyor, means for connecting a rolled sheet of flexible material to the conveyor and for moving the sheet through the machine from the roll, means for periodically stopping the conveyor so that succeeding sections of the sheet will stop at each of several stations positioned along the line of travel of the conveyor means, means for applying different colored paint at certain of the stations to a section of the sheet as it is successively stopped at said paint stations, means for drying the paint at a single station beyond the paint stations, means for severing each section from the continuous material after the section is painted and while still connected to the conveyor means, cooperating moulds having male and female dies for forming the sheet material of each section into predetermined shapes after movement between the moulds by the conveyor means, said machine being so constructed and operated that painting, drying, severing and mould forming are occurring in a simultaneous manner on successive parts of the material each time the conveyor is stopped.

20. In a machine of the class described, a conveyor, means for connecting a rolled sheet of flexible material to the conveyor and for moving the sheet through the machine from the roll, means for periodically stopping the conveyor so that succeeding sections of the sheet will stop at each of several stations positioned along the line of travel of the conveyor means, means for applying different colored paint at certain of the stations to a section of the sheet as it is successively stopped at said paint stations, means for drying the paint at a single station beyond the paint stations, means for severing each section from the continuous material after the section is painted, means for moistening each section when in its severed condition and while still connected to the conveyor means, and cooperating heated moulds having male and female dies for forming the sheet material of each section into predetermined shapes, said forming moulds being positioned at a station on the conveyor beyond the moistening means so that the sheet section can be moved thereinto by the conveyor and said machine being so constructed and operated that painting, drying, sawing and mould forming are occurring in a simultaneous manner on successive parts of the material each time the conveyor is stopped.

21. In a machine of the class described, a conveyor, means for connecting a rolled sheet of flexible material to the conveyor and for moving the sheet through the machine from the roll, means for periodically stopping the conveyor so that succeeding sections of the sheet will stop at each of several stations positioned along the line of travel of the conveyor means, means for applying different colored paint at certain of the stations to a section of the sheet as it is successively stopped at said paint stations, means for drying the paint at a single station beyond the paint stations, saw means for severing each section from the continuous material after the section is painted, means for moistening each section when in its severed condition and while still connected to the conveyor means, cooperating heated moulds having male and female dies for forming the sheet material of each section into predetermined shapes, said forming mould being positioned at a station on the conveyor beyond the moistening means so that the sheet section can be moved thereinto by the conveyor and said machine being so constructed and operated that painting, drying, sawing and mould forming are occurring in a simultaneous manner on successive parts of the material each time the conveyor is stopped, and mechanically operated means separate from the conveyor for removing each moulded sheet from between the moulds on the side opposite that where the sheet enters between the moulds.

22. In a method of making face masks, the steps comprising applying by a silk screen process and in successive order to a flat sheet of glue-sized material different colored paint to simulate features of a face thereon, drying the paint only after all the different colors are applied, moistening the sheet with the paint applied thereto, and then forming the sheet by cooperating dies to establish the contour of a face, said sheet having its colors so placed thereon and being so associated with the dies that the formed contours of the face will have colors properly located thereon so that the resulting mask will simulate a face.

23. In a method of making face masks from a continuous sheet of glue-sized material, the steps comprising applying by a silk screen process and in successive order to a section of said sheet different colored paint to simulate features of faces thereon, drying the paint only after all the different colors are applied, severing the section from the continuous sheet, moistening the section with the paint applied thereto, and then forming the section by cooperating dies to establish the contours of faces, said section having its colors so placed thereon and being so associated with the dies that the formed contours of the faces will have colors properly located thereon.

24. In a method of making face masks in a continuous manner comprising applying by a silk screen process to successive sections of a continuous sheet of buckram material coming from a roll paint of different colors to simulate a plurality of facial features on the exposed surface of the buckram material with each single color being applied separately and simultaneously to the plurality of faces being simulated, drying the applied paint only after all the different colors are applied, successively cutting sections from the end of the combined sheets after the faces are painted with each section containing a plurality of faces, and then placing the sections in successive order between a plurality of cooperating heated dies and forming a plurality of contoured faces from each section of the sheet with each formed face being so placed on the section that it will have properly placed thereon a painted face.

25. In a method of making face masks in a continuous manner comprising applying by a silk screen process to successive sections of a continuous sheet of buckram material coming from a roll paint of different colors to simulate a plurality of facial features with each single color being applied separately and simultaneously to the plurality of faces being simulated, drying the applied paint only after all the different colors are applied, successively cutting the sections from the continuous sheet after the faces are painted with each section containing a plurality of faces, moistening the sections successively, and then placing the sections in successive order between a plurality of cooperating heated dies and forming a plurality of contoured faces from each section of the sheet with each formed face being so placed on the section that it will have properly placed thereon a painted face.

26. In a method of making face masks in a continuous manner comprising applying to a continuous sheet of buckram material coming from a roll a colored dye to simulate flesh, adhering to one side of the buckram sheet a sheet of soft tissue material also coming from a roll, drying the combined sheets, painting in different colors a plurality of facial features on the exposed surface of the buckram material each single color being applied separately and simultaneously to a plurality of faces being simulated, drying the applied paint only after all the different colors are applied, successively cutting sections from the end of the combined sheets after the faces are painted with each section containing a plurality of faces, moistening the sections successively, and then placing the sections in successive order between a plurality of cooperating heated dies and forming a plurality of contoured faces from each section of the combined sheets with each formed face being so placed on the sheet that it will have properly placed thereon a painted face.

27. A method of moulding a plurality of contoured shapes from a flat sheet of sized flexible material and by the use of cooperating moulds having a plurality of sets of companion male and female dies comprising holding the central part of the sheet in a non-shiftable condition and lowering said held part while in a held condition to a point below the top surface of the male dies carried by one of the moulds prior to the molds assuming a cooperating moulding condition and thereby drawing in the edges of the sheet of material and then moulding the sheet.

28. A method of moulding a plurality of contoured shapes from a flat sheet of sized flexible material and by the use of cooperating moulds having a plurality of sets of companion male and female dies comprising holding the central part of the sheet in a non-shiftable condition, and then lowering said held part while remaining held and parts on each opposite side thereof to points below the top surface of the male dies carried by one of the moulds, all prior to the moulds assuming a cooperating moulding condition and thereby drawing in the portions of the sheet material and then moulding the sheet between male dies.

29. A method of moulding a plurality of contoured shapes from a flat rectangular sheet of sized flexible material and by the use of heated cooperating moulds having a plurality of sets of companion male and female dies comprising holding the central part of the sheet in a non-shiftable condition and during said holding lowering said central part to a point below the top surface of the male dies carried by one of the moulds prior to the moulds assuming a cooperating moulding condition and thereby drawing in all the edges of the sheet of material and then moulding the sheet.

30. A method of simultaneously moulding a plurality of contoured shapes in a sheet of flexible material of such substance that it is capable of assuming a contoured shape when acted on by heated companion male and female dies, said method comprising placing the sheet between moulds having a plurality of heated companion male and female dies, holding the central part of the sheet and moving said part to a point beneath the plane of the top surfaces of the male dies carried by one of the moulds and prior to the moulds assuming moulding relationship and thereby drawing in the edges of the sheet of material, slidably holding said sheet at points radially outward from the central part and in circumferentially spaced relation and then bringing said moulds into cooperating relation with the sheet therebetween.

31. A method of simultaneously moulding a plurality of contoured shapes in a sheet of flexible material of such substance that it is capable of assuming a contoured shape when acted on by heated companion male and female dies, said method comprising placing the sheet between moulds having a plurality of heated companion male and female dies, moving the central part of the sheet along a cross line to a position beneath the plane of the top surfaces of the male dies carried by one of the moulds and prior to the moulds assuming moulding relationship and thereby drawing in edges of the sheet of material, and slidably holding marginal portions of said sheet during the drawing in operation, and then bringing said moulds into cooperating relation.

32. A method of simultaneously moulding a plurality of contoured shapes in a sheet of flexible material of such substance that it is capable of assuming a contoured shape when acted on by heated companion male and female dies, said method comprising placing the sheet between moulds having a plurality of heated companion male and female dies, pushing the central part of the sheet between adjacent male dies prior to the moulds assuming moulding relationship, and slidably holding said sheet at points radially outward from the central part during the pushing operation, and then bringing said moulds into cooperating relation with the sheet therebetween.

33. In a machine of the class described, means for removing a member from a press after being acted thereon by the press, said means comprising, an endless belt structure, a finger pivoted to the belt structure to move therewith and having a free end, a second pivotal mounting including a roller for the finger intermediate its free end and the pivotal connection with the belt, guide means restraining the second pivotal mounting and its roller to move in parallel relation to the runs of the belt structure, and means for moving the belt structure to thereby cause the free end of the finger to move forwardly to a position beneath the member acted on by the press as the finger is moved by the belt on its upper run, the free end of finger to be raised to engage and lift the member as the pivotal connection of the finger moves with the belt structure to its lower run and the member then to be withdrawn from the press as the finger is moved by the chain structure along with its lower run and finally the free end of the finger to be lowered away from the member as the pivotal connection of the finger with the belt is carried back again to upper run of the belt.

References Cited in the file of this patent

UNITED STATES PATENTS

| Number | Name | Date |
| --- | --- | --- |
| 332,778 | Barlow | Dec. 22, 1885 |
| 964,232 | Gilfillan et al. | July 12, 1910 |

| Number | Name | Date |
|---|---|---|
| 1,151,624 | Sonneborn | Aug. 31, 1915 |
| 1,181,389 | Joslin | May 2, 1916 |
| 1,181,964 | Bohlman | May 2, 1916 |
| 1,332,963 | Tucker et al. | Mar. 9, 1920 |
| 1,628,257 | Mallory | May 10, 1927 |
| 1,671,577 | Gluckin et al. | May 29, 1928 |
| 1,709,788 | Greene | Apr. 16, 1929 |
| 1,764,215 | Kupper | June 15, 1930 |
| 1,780,012 | Fine | Oct. 28, 1930 |
| 1,801,309 | Gipe | Apr. 21, 1931 |
| 1,843,116 | Aldcroftt et al. | Feb. 2, 1932 |
| 1,879,555 | Simmons | Sept. 27, 1932 |
| 1,908,699 | Ellis | May 16, 1933 |
| 1,926,815 | Palmer | Sept. 12, 1933 |
| 1,932,301 | Bowman et al. | Oct. 24, 1933 |
| 1,948,314 | Pratt et al. | Feb. 20, 1934 |
| 2,074,285 | Studt et al. | Mar. 16, 1937 |
| 2,120,328 | Ferngren | June 14, 1938 |
| 2,267,596 | Montague et al. | Dec. 23, 1941 |
| 2,285,903 | Clark | June 9, 1942 |
| 2,325,752 | Dodge | Aug. 3, 1943 |
| 2,330,073 | Melup | Sept. 21, 1943 |
| 2,377,351 | Martin | June 5, 1945 |
| 2,410,361 | Prance | Oct. 29, 1946 |
| 2,415,391 | Lovell et al. | Feb. 4, 1947 |
| 2,467,572 | Weisselberg | Apr. 19, 1949 |
| 2,483,093 | Harvey | Sept. 27, 1949 |
| 2,483,094 | Harvey | Sept. 27, 1949 |
| 2,489,121 | Collins | Nov. 22, 1949 |
| 2,499,399 | Lyon | Mar. 7, 1950 |
| 2,518,565 | Nicolle | Aug. 15, 1950 |
| 2,522,956 | Middleton | Sept. 19, 1950 |
| 2,547,331 | Lent | Apr. 3, 1951 |
| 2,609,776 | Sahlin | Sept. 9, 1952 |
| 2,634,789 | Burdick | Apr. 14, 1953 |

FOREIGN PATENTS

| Number | Country | Date |
|---|---|---|
| 379,035 | Great Britain | Aug. 25, 1932 |